(12) United States Patent
Minamizawa

(10) Patent No.: US 8,190,874 B2
(45) Date of Patent: May 29, 2012

(54) DATA TRANSMISSION SYSTEM AND DATA TRANSMISSION METHOD

(75) Inventor: Takeaki Minamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1145 days.

(21) Appl. No.: 11/312,493

(22) Filed: Dec. 21, 2005

(65) Prior Publication Data

US 2006/0133617 A1    Jun. 22, 2006

(30) Foreign Application Priority Data

Dec. 21, 2004 (JP) ................................. 2004-369849

(51) Int. Cl.
*H04L 29/06* (2006.01)
(52) U.S. Cl. ........................................................ 713/150
(58) Field of Classification Search .................... 713/150
See application file for complete search history.

(56) References Cited

U.S. PATENT DOCUMENTS

| | | | | |
|---|---|---|---|---|
| 6,157,723 | A * | 12/2000 | Schultz ......................... | 380/273 |
| 6,453,159 | B1 * | 9/2002 | Lewis ........................... | 455/411 |
| 6,892,306 | B1 * | 5/2005 | En-Seung et al. ............ | 713/193 |
| 2001/0036271 | A1 * | 11/2001 | Javed ............................ | 380/217 |
| 2002/0099947 | A1 * | 7/2002 | Evans ........................... | 713/193 |
| 2003/0037250 | A1 * | 2/2003 | Walker et al. ................ | 713/200 |
| 2004/0147246 | A1 * | 7/2004 | Kim .............................. | 455/411 |

FOREIGN PATENT DOCUMENTS

| | | |
|---|---|---|
| JP | 06-177888 | 6/1994 |
| JP | 7-162693 A | 6/1995 |
| JP | 8-111671 A | 4/1996 |
| JP | 2000-059352 A | 2/2000 |
| JP | 2000-224156 | 8/2000 |
| JP | 2000-267939 A | 9/2000 |
| JP | 2002-318788 | 10/2002 |
| JP | 2002-367091 A | 12/2002 |
| JP | 2004-056762 A | 2/2004 |

* cited by examiner

*Primary Examiner* — Michael S McNally
(74) *Attorney, Agent, or Firm* — Dickstein Shapiro LLP

(57) ABSTRACT

A data transmission system includes a server and a terminal which communicates with the server. The server includes a key storage unit, data encryption unit, key transmission unit, and server encrypted-data transmission unit. The key storage unit stores a plurality of keys to encrypt data. The data encryption unit generates a plurality of encrypted data by encrypting data with the plurality of keys stored in the key storage unit. The key transmission unit transmits in advance, to the terminal, one key to decrypt one of the encrypted data generated by the data encryption unit. The server encrypted-data transmission unit transmits, to the terminal, the encrypted data generated by the data encryption unit. The terminal includes a decryption unit which decrypts the encrypted data transmitted from the server with a key transmitted in advance from the server. A data transmission method, data transmission server, data reception terminal, and recording medium are also disclosed.

9 Claims, 14 Drawing Sheets

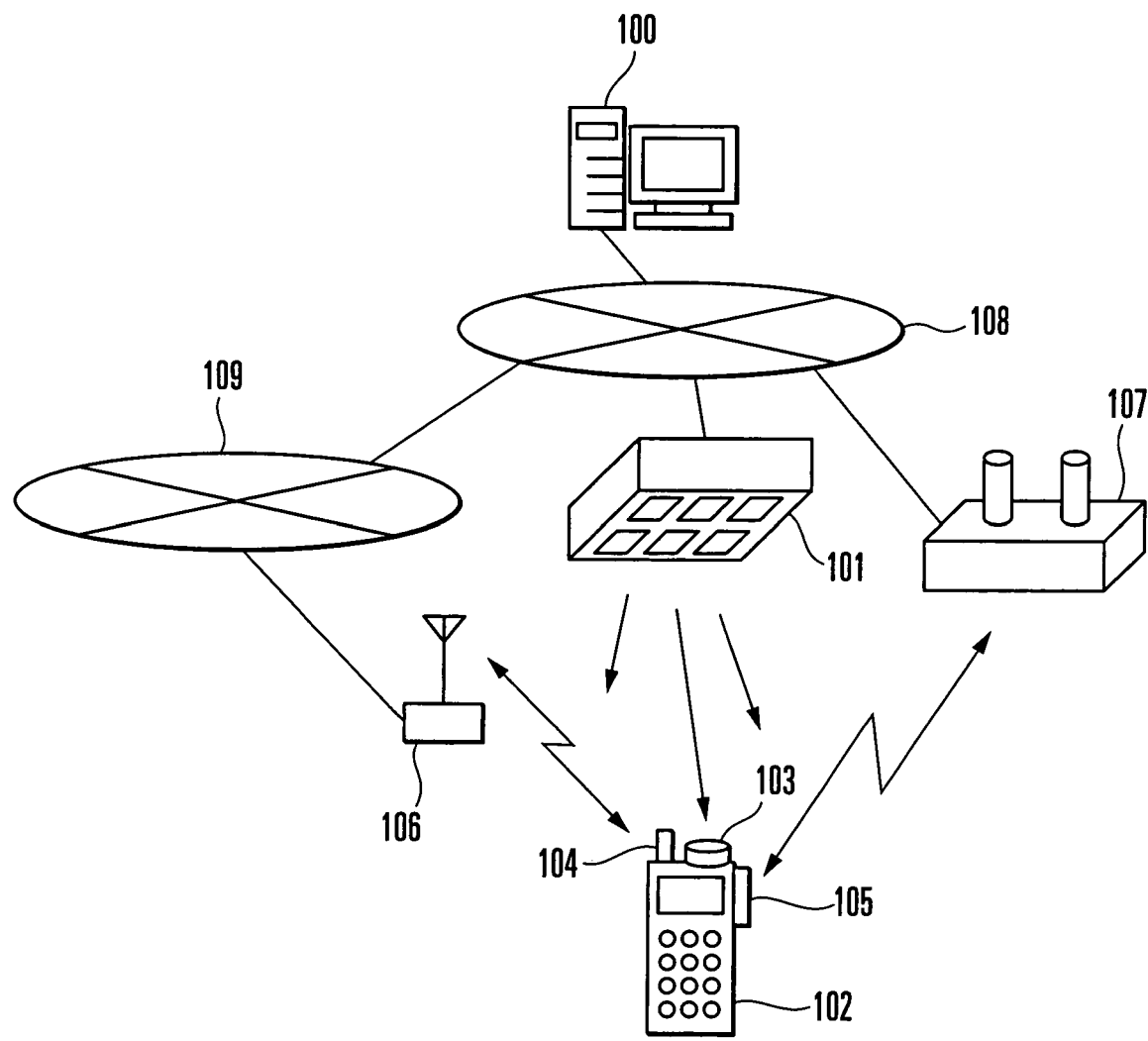
F I G. 1

| KEY GENERATION DATE | KEY |
|---|---|
| 9/20 | KEY[d] |
| 9/19 | KEY[d-1] |
| 9/18 | KEY[d-2] |
| 9/17 | KEY[d-3] |
| 9/16 | KEY[d-4] |
| 9/15 | KEY[d-5] |
| 9/14 | KEY[d-6] |
| 9/13 | KEY[d-7] |
| 9/12 | KEY[d-8] |
| ⋮ | ⋮ |

| USER ID | PASSWORD | TERMINAL KEY VALID DAY COUNT |
|---|---|---|
| aaa | 123 | 1 |
| bbb | 234 | 1 |
| ccc | 345 | 3 |
| ddd | 456 | 7 |
| eee | 567 | 7 |
| ⋮ | ⋮ | ⋮ |

| TERMINAL KEY VALID DAY OF WEEK | | | | | | | KEY |
|---|---|---|---|---|---|---|---|
| 0 | 0 | 0 | 0 | 0 | 0 | 0 | KEY[0] |
| 0 | 0 | 0 | 0 | 0 | 0 | 1 | KEY[1] |
| 0 | 0 | 0 | 0 | 0 | 1 | 0 | KEY[2] |
| 0 | 0 | 0 | 0 | 0 | 1 | 1 | KEY[3] |
| 0 | 0 | 0 | 0 | 1 | 0 | 0 | KEY[4] |
| 0 | 0 | 0 | 0 | 1 | 0 | 1 | KEY[5] |
| 0 | 0 | 0 | 0 | 1 | 1 | 0 | KEY[6] |
| 0 | 0 | 0 | 0 | 1 | 1 | 1 | KEY[7] |
| 0 | 0 | 0 | 1 | 0 | 0 | 0 | KEY[8] |
| 0 | 0 | 0 | 1 | 0 | 0 | 1 | KEY[9] |
| ⋮ | ⋮ | ⋮ | ⋮ | ⋮ | ⋮ | ⋮ | ⋮ |
| 1 | 1 | 1 | 1 | 1 | 0 | 1 | KEY[125] |
| 1 | 1 | 1 | 1 | 1 | 1 | 0 | KEY[126] |
| 1 | 1 | 1 | 1 | 1 | 1 | 1 | KEY[127] |

| 0/1 | 0/1 | 0/1 | 0/1 | 0/1 | 0/1 | 0/1 |
|---|---|---|---|---|---|---|
| SATURDAY | FRIDAY | THURSDAY | WEDNESDAY | TUESDAY | MONDAY | SUNDAY |

FIG. 10

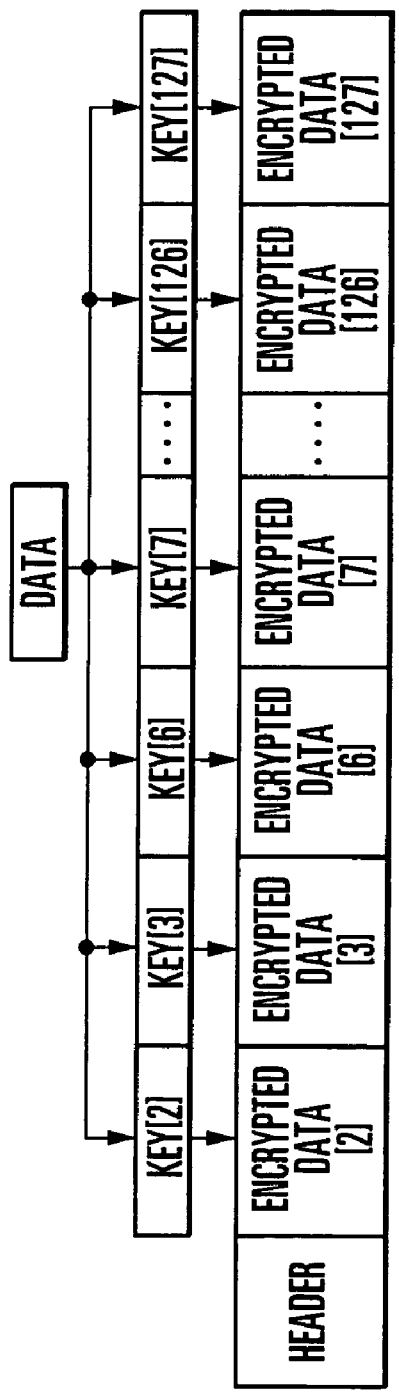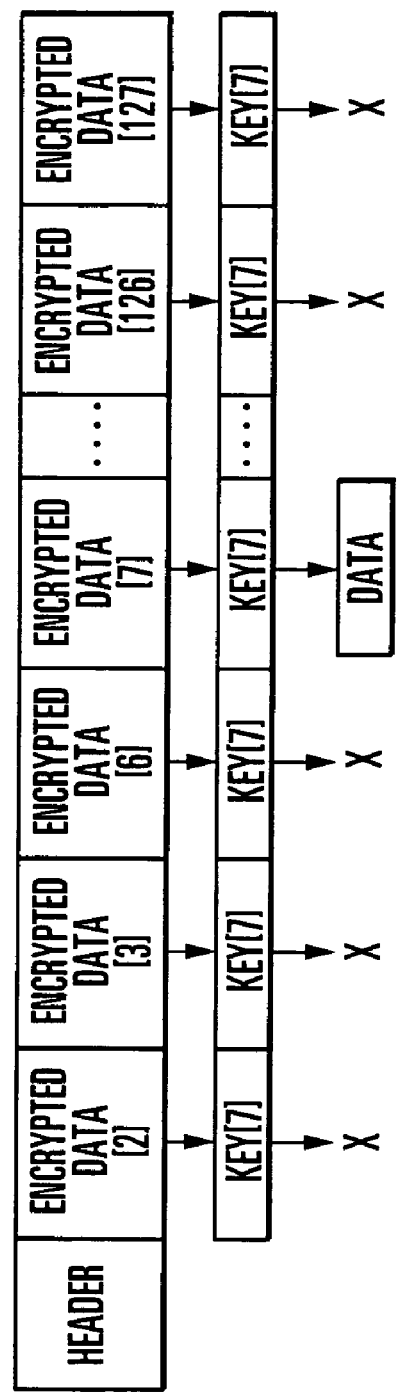

DATA TRANSMISSION SYSTEM AND DATA TRANSMISSION METHOD

BACKGROUND OF THE INVENTION

The present invention relates to a data transmission system and data transmission method using one-way communication.

Recently, cell phones have a near-field communication function such as a wireless LAN or Bluetooth®. In the future, cell phones will be equipped with a one-way communication function of receiving data transmitted by light generated by an LED illumination light or the like.

As various communication means are installed in cell phones, the chance to connect a cell phone to a communication network and transmit setting information of application software to the cell phone increases in accordance with the position and situation.

Conventionally, a server which transmits various kinds of setting information performs user authentication at a timing when various kinds of setting information are transmitted, and determines whether a cell phone has the right to receive various kinds of setting information.

For example, reference 1 (Japanese Patent Laid-Open No. 6-177888) proposes a system which, when connection setting information to a communication network is not stored in a computer system upon activation, requests a gateway to transmit connection setting information to the communication network and receives the connection setting information.

Reference 2 (Japanese Patent Laid-Open No. 2002-318788) proposes a terminal which receives an IC card on which connection information to a communication network is stored, reads out the connection information to the communication network that is stored in the mounted IC card, and is connected to the communication network.

Reference 3 (Japanese Patent Laid-Open No. 2000-224156) proposes a system in which the first apparatus transmits an instruction and encryption information to the second apparatus by one-way communication, and the second apparatus transmits, to the first apparatus, information encrypted using the encryption information received from the first apparatus.

In one-way communication using an LED illumination light or the like, the server cannot perform user authentication in transmitting various kinds of setting information. It is difficult to transmit setting information of a use condition which changes depending on the user.

A cell phone is considered to receive various kinds of setting information via a cell phone communication network by using a communication method such as PDC (Personal Digital Cellular) or CDMA (Code Division Multiple Access). A location where the user wants to receive information does not always fall within the service providing range of cell phone communication. It is an important subject to implement a method of using one-way communication to transmit data such as various kinds of setting information corresponding to the user of a cell phone.

The system described in reference 1 uses two-way communication, and cannot use one-way communication to transmit information corresponding to the user. This system cannot be applied to a system used in a situation in which no two-way communication can be done.

The terminal described in reference 2 cannot automatically receive connection information to a communication network because the user inserts/removes an IC card. The terminal cannot be connected to a communication network whose connection information is not stored in user's IC card.

The system described in reference 3 does not consider the use in a situation in which two-way communication is impossible between the first and second apparatuses. The system cannot be applied to a system used in a situation in which communication from the second apparatus to the first apparatus is impossible.

SUMMARY OF THE INVENTION

It is an object of the present invention to make it possible to transmit information corresponding to the user by one-way communication.

A data transmission system according to the present invention comprises a server, and a terminal which communicates with the server, the server comprising key storage means for storing a plurality of keys to encrypt data, encryption means for generating a plurality of encrypted data by encrypting data with the plurality of keys stored in the key storage means, key transmission means for transmitting in advance, to the terminal, one key to decrypt one of the encrypted data generated by the encryption means, and encrypted-data transmission means for transmitting, to the terminal, the encrypted data generated by the encryption means, and the terminal comprising decryption means for decrypting the encrypted data transmitted from the server with a key transmitted in advance from the server.

A data transmission method according to the present invention comprises the steps of transmitting in advance, to a terminal, one key to decrypt encrypted data obtained by encrypting data, generating a plurality of encrypted data by encrypting data with a plurality of keys, transmitting the generated encrypted data to the terminal, and decrypting the encrypted data by the terminal with the key transmitted in advance.

A data transmission server according to the present invention comprises key storage means for storing a plurality of keys to encrypt data, encryption means for generating a plurality of encrypted data by encrypting data with the plurality of keys stored in the key storage means, concatenating the generated encrypted data, adding, to a start of concatenated encrypted data, a header containing encrypted-data start information serving as information representing a start position of each encrypted data, and generating concatenated encrypted data, key transmission means for transmitting in advance one key to decrypt one of the encrypted data generated by the encryption means, and encrypted-data transmission means for transmitting the concatenated encrypted data generated by the encryption means.

A data reception terminal according to the present invention comprises data reception means for receiving concatenated encrypted data obtained by concatenating a plurality of encrypted data prepared by encrypting data, and adding, to a start of concatenated encrypted data, a header containing encrypted-data start information serving as information representing a start position of each encrypted data, key reception means for receiving one key transmitted in advance, the key being used to decrypt one of the encrypted data, and decryption means for decrypting, on the basis of the encrypted-data start information contained in the received concatenated encrypted data, encrypted data corresponding to the received key out of the encrypted data which are concatenated as the concatenated encrypted data.

BRIEF DESCRIPTION OF THE DRAWINGS

FIG. 1 is a block diagram showing an example of a configuration in the first embodiment of the present invention;

FIG. 10 is a table showing an example of a key storage table in the second embodiment;

FIGS. 13A and 13B are views for explaining a process for data generated by the data generation unit in the second embodiment;

DESCRIPTION OF THE PREFERRED EMBODIMENTS

First Embodiment

Figure 2:
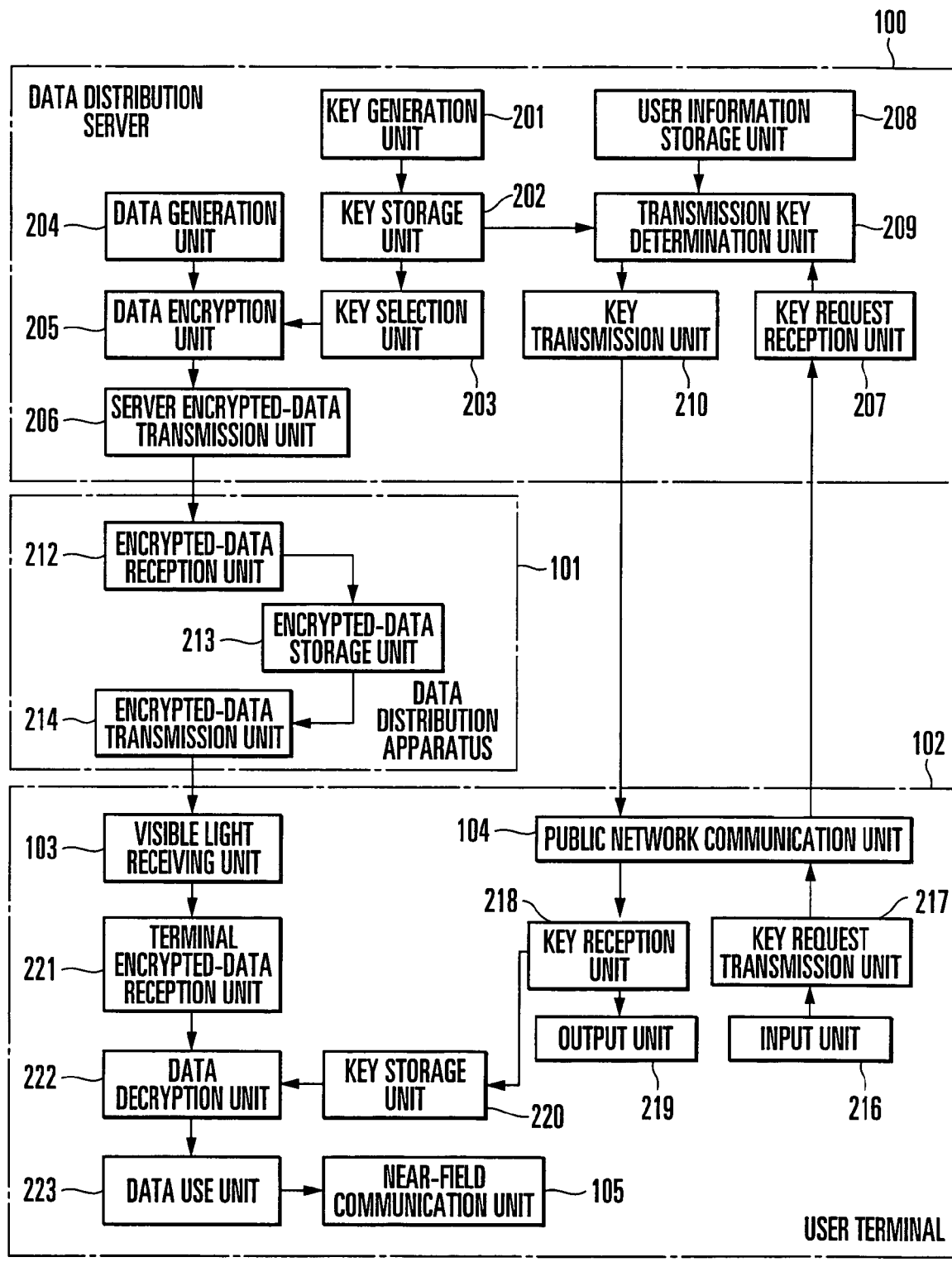
FIG. 2 is a block diagram showing an example of the configurations of a data distribution server, data distribution apparatus, and user terminal in the first embodiment.

The first embodiment of the present invention will be described with reference to the accompanying drawings. FIG. 1 shows an example of a configuration in the first embodiment of the present invention.

The first embodiment of the present invention comprises a user terminal (terminal or data reception terminal) 102 which is implemented by a cell phone or the like, a data distribution apparatus (transmission apparatus) 101 which transmits data to the user terminal 102 by visible light, a data distribution server (server or data transmission server) 100 which generates data to be transmitted from the data distribution apparatus 101 to the user terminal 102, a wireless LAN access point 107 which connects the user terminal 102 and a communication network 108 by a wireless LAN, and a base station 106 which connects the user terminal 102 and a public communication network 109.

The user terminal 102 includes a visible light receiving unit (data reception means) 103 which receives visible light emitted by the data distribution apparatus 101 and receives data, a public network communication unit 104 which is connected to the public communication network 109 via the base station 106 by a communication method such as PDC or CDMA, and a near-field communication unit 105 which is connected to the communication network 108 via the wireless LAN access point 107 by a wireless LAN.

The user terminal 102 is implemented by a cell phone, PHS (Personal Handy phone System) terminal, personal computer, PDA (Personal Digital Assistance), or the like.

The communication network 108 is implemented by the Internet, an intranet, or the like. The public communication network 109 is implemented by a cell phone communication network, PHC communication network, or the like.

The data distribution apparatus 101, data distribution server 100, and wireless LAN access point 107 are connected to the communication network 108. The base station 106 is connected to the public communication network 109. The communication network 108 and public communication network 109 are connected to each other via a gateway (not shown). The system may include a plurality of data distribution apparatuses 101 and a plurality of user terminals 102.

FIG. 2 shows an example of the configurations of the data distribution server 100, data distribution apparatus 101, and user terminal 102 in the first embodiment.

The data distribution server 100 includes a data generation unit 204, key generation unit (key generation means) 201, key storage unit (key storage means) 202, key selection unit 203, data encryption unit (encryption means) 205, server encrypted-data transmission unit (encrypted-data transmission means) 206, key request reception unit 207, user information storage unit 208, transmission key determination unit (transmission key determination means) 209, and key transmission unit (key transmission means) 210.

The data generation unit 204 generates data to be transmitted to the user terminal 102. The key generation unit 201 generates a key used to encrypt and decrypt data generated by the data generation unit 204. The key storage unit 202 stores a plurality of keys generated by the key generation unit 201. The key selection unit 203 selects a key used to encrypt and decrypt data from a plurality of keys stored in the key storage unit 202. The data encryption unit 205 encrypts data generated by the data generation unit 204 by using a key selected by the key selection unit 203.

Figures 3, 4, 5:
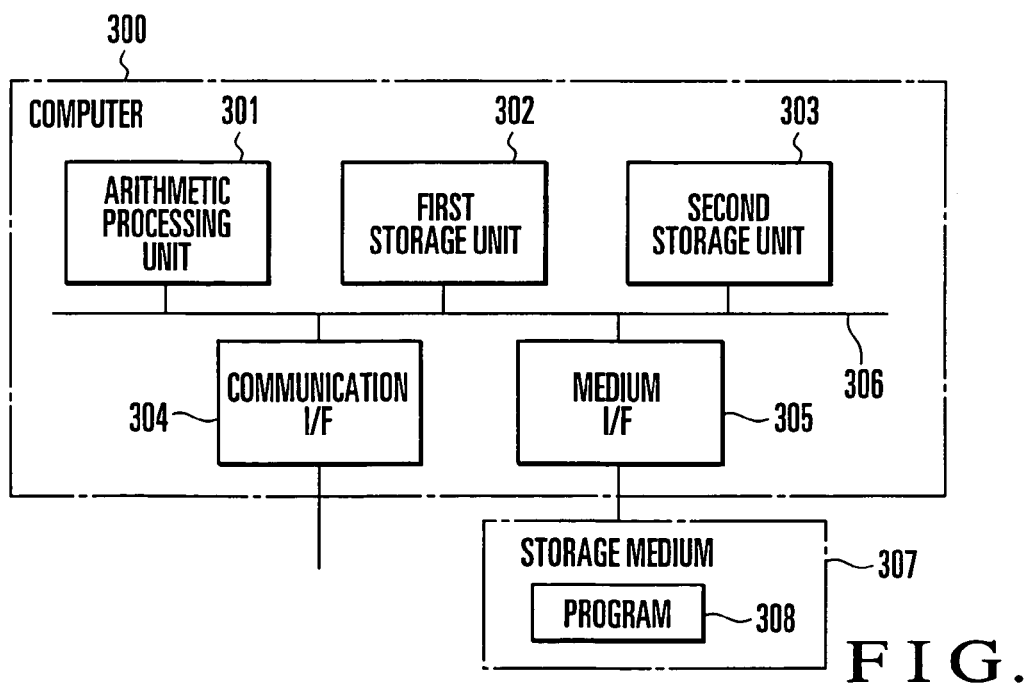
FIG. 3 is a graph showing an example of a key storage table in the first embodiment.
FIG. 4 is a graph showing an example of a user information table in the first embodiment.
FIG. 5 is a block diagram showing an example of the configuration of a computer which implements the data distribution server in the first embodiment.

Note that the key storage unit 202 stores, in, e.g., the table form, keys and dates when the keys are generated. FIG. 3 shows an example of a key storage table serving as a table which makes keys stored in the key storage unit 202 correspond to key generation dates serving as dates when the keys are generated. The key storage unit 202 stores a maximum key valid day count serving as a value which defines in advance the maximum number of days for which a key transmitted to the user terminal 102 can be utilized. Assume that all keys stored in the key storage unit 202 have the same maximum key valid day count.

The server encrypted-data transmission unit 206 transmits data encrypted by the data encryption unit 205 to the data distribution apparatus 101 via the communication network 108. The key request reception unit 207 receives a key distribution request from the user terminal 102 via the base station 106 and public communication network 109. The user information storage unit 208 stores user information for determining a key transmission condition. The transmission key determination unit 209 determines a key to be transmitted to the user terminal 102 by using user information stored in the user information storage unit 208. The key transmission unit 210 transmits a key determined by the transmission key determination unit 209 to the user terminal 102 via the public communication network 109 and base station 106.

Note that a key which is determined by the transmission key determination unit 209 so as to be transmitted to the user terminal 102 may be supplied to the user terminal 102 by a storage medium such as an IC card, USB (Universal Serial Bus) memory, or floppy disk®.

The user information storage unit 208 stores user information in, e.g., the table form. FIG. 4 shows an example of a user information table serving as a table of user information stored in the user information storage unit 208 in the first embodiment. The user information table makes a user ID and password used to perform user authentication correspond to a terminal key valid day count representing the number of valid days of a key distributed to the user. The terminal key valid day count is equal to or smaller than the maximum key valid day count.

The data distribution apparatus 101 includes an encrypted-data reception unit 212 which receives encrypted data transmitted from the server encrypted-data transmission unit 206 of the data distribution server 100, an encrypted-data storage unit 213 which stores data received by the encrypted-data reception unit 212, and an encrypted-data transmission unit (one-way transmission means) 214 which repetitively transmits data stored in the encrypted-data storage unit 213 to the user terminal 102.

The encrypted-data transmission unit 214 of the data distribution apparatus 101 is implemented by, e.g., an LED illumination device. The encrypted-data transmission unit 214 of the data distribution apparatus 101 may perform one-way communication by using an apparatus capable of two-way communication such as infrared communication.

The user terminal 102 includes the visible light receiving unit 103, the public network communication unit 104, the near-field communication unit 105, an input unit 216, a key request transmission unit 217, a key reception unit (key reception means) 218, an output unit 219, a key storage unit 220, a terminal encrypted-data reception unit 221, a data decryption unit (decryption means) 222, and data use unit 223.

The input unit 216 is implemented by buttons and the like for inputting user information (e.g., a user ID and password) necessary to request the data distribution server 100 by the user to transmit a key, and key transmission request information representing a request to transmit a key. When user information and key transmission request information are input to the input unit 216, the key request transmission unit 217 transmits them to the data distribution server 100 via the public network communication unit 104, base station 106, and public communication network 109.

The key reception unit 218 receives a key from the data distribution server 100 via the public communication network 109, base station 106, and public network communication unit 104. The output unit 219 is implemented by, e.g., a display which displays information received by the key reception unit 218 from the data distribution server 100 via the public communication network 109, base station 106, and public network communication unit 104 in accordance with key transmission request information transmitted from the key request transmission unit 217.

The key storage unit 220 stores a key received by the key reception unit 218. The terminal encrypted-data reception unit 221 receives, via the visible light receiving unit 103, data transmitted from the encrypted-data transmission unit 214 of the data distribution apparatus 101. The data decryption unit 222 uses a key stored in the key storage unit 220 to decrypt data received by the terminal encrypted-data reception unit 221. The data use unit 223 makes a setting of using data decrypted by the data decryption unit 222 to connect the near-field communication unit 105 to the communication network 108 via the wireless LAN access point 107 by a wireless LAN.

The data distribution server 100 can also be implemented in cooperation with a computer 300 and data transmission program 308 shown in FIG. 5. The computer 300 is configured by connecting, via an internal bus 306, an arithmetic processing unit 301, first storage unit 302, second storage unit 303, communication interface (communication I/F) 304, and medium interface (medium I/F) 305.

The data transmission program 308 is provided while stored in a storage medium 307 such as a magnetic disk or optical disk. When the storage medium 307 which stores the data transmission program 308 is connected to the medium I/F 305, the arithmetic processing unit 301 reads out the data transmission program 308 and transfers it to the second storage unit 303 to store the data transmission program 308.

When the arithmetic processing unit 301 executes the data transmission program 308 stored in the second storage unit 303, the data transmission program 308 executes a process, encryption process, encrypted-data transmission process, and key transmission process. In the process, the first storage unit 302 is caused to function as the key storage unit 202, and a plurality of keys to encrypt data are stored in the key storage unit 202. In the encryption process, encrypted data are generated by encrypting data with a plurality of keys stored in the key storage unit 202, and the generated encrypted data are concatenated. A header containing encrypted-data start information serving as information representing the start position of each encrypted data is added to the start of the concatenated encrypted data. In the encrypted-data transmission process, the concatenated encrypted data generated in the encryption process is transmitted. In the key transmission process, one key having a limited period during which the encrypted data can be decrypted is transmitted in advance.

Operation of the first embodiment according to the present invention will be explained with reference to the accompanying drawings. Preliminary operation before the user terminal 102 receives data such as various kinds of setting information from the data distribution server 100 will be explained. This operation is executed after, for example, the user is registered as a member by the administrators of the data distribution server 100 and data distribution apparatus 101. The operation need not be executed every time data is received by one-way communication.

Assume that the administrator of the data distribution server 100 issues a user ID and password when the user is registered as a member, the user information storage unit 208 stores the issued user ID and password in correspondence with a terminal key valid day count corresponding to the user, and the administrator of the data distribution server 100 notifies the user of the issued user ID and password. The administrator of the data distribution server 100 may determine a terminal key valid day count in accordance with, e.g., the amount of money paid by the user in member registration.

Figure 6:
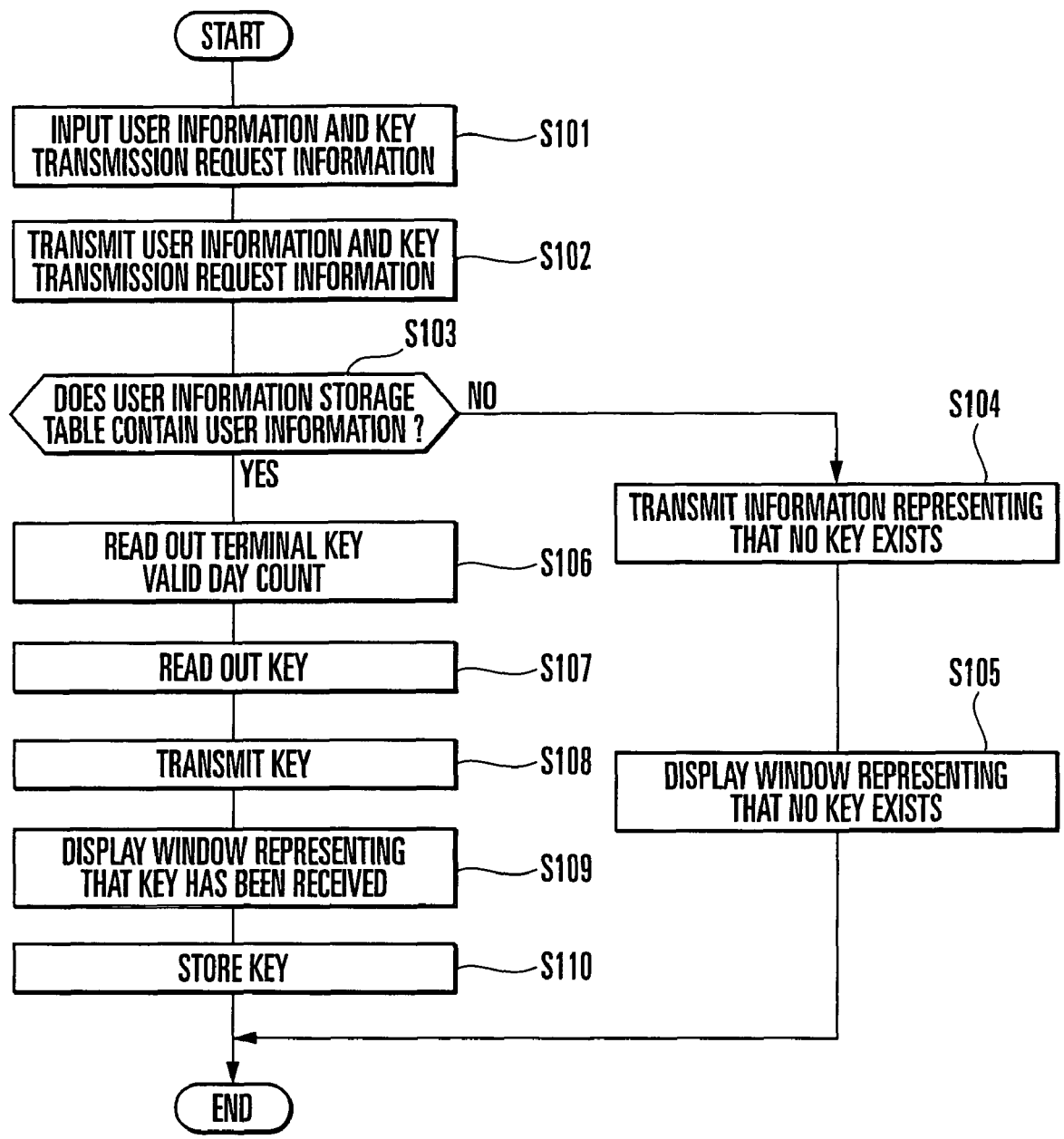
FIG. 6 is a flowchart for explaining preliminary operation in the first embodiment of the present invention.

FIG. 6 shows preliminary operation in the first embodiment of the present invention. The user operates, e.g., the buttons of the input unit 216 of the user terminal 102 to input a user ID and password serving as user information, and key transmission request information representing a request to transmit a key (step S101).

The input unit 216 outputs the input user information and key transmission request information to the key request transmission unit 217. The key request transmission unit 217 transmits the user information and key transmission request information to the data distribution server 100 via the public network communication unit 104, base station 106, and public communication network 109 (step S102).

Upon reception of the user information and key transmission request information, the key request reception unit 207 of the data distribution server 100 inputs the user ID and password of the user information to the transmission key determination unit 209. The transmission key determination unit 209 determines whether the input user ID and password are contained in the user information storage table stored in the user information storage unit 208 (step S103).

If the transmission key determination unit 209 determines that the input user ID and password are not contained in the user information storage table, it notifies the key transmission unit 210 that a key to be transmitted does not exist. The key transmission unit 210 transmits, to the user terminal 102 via the public communication network 109 and base station 106, information representing that a key to be transmitted does not exist (step S104). When the key reception unit 218 receives, via the public network communication unit 104, the information representing that a key to be transmitted does not exist, the output unit 219 of the user terminal 102 displays a window representing that a key to be transmitted does not exist (step S105).

If the transmission key determination unit 209 determines that the input user ID and password are contained in the user information storage table, it reads out a terminal key valid day count corresponding to the input user ID and password (step S106). The terminal key valid day count is a value which defines the number of valid days of a key distributed by the data distribution server 100 to the user terminal 102. For example, when the user ID is "ccc" and the password is "345", the terminal key valid day count is 3 by referring to the user information table shown in the example of FIG. 4.

The transmission key determination unit 209 refers to the key storage table stored in the key storage unit 202, and reads out, from the key storage unit 202, a key which was generated by the key generation unit 201 before (maximum key valid day count −terminal key valid day count) days (step S107). Then, the transmission key determination unit 209 inputs the key to the key transmission unit 210.

For example, when the maximum key valid day count is 7, the terminal key valid day count is 3, and the date when the key request reception unit 207 received user information and key transmission request information is September 20, the transmission key determination unit 209 refers to the key storage table stored in the key storage unit 202, and reads outs, from the key storage unit 202, a key which was generated by the key generation unit 201 before four days because (maximum key valid day count−terminal key valid day count) =7−3=4.

More specifically, the transmission key determination unit 209 refers to the key storage table stored in the key storage unit 202, and reads out, from the key storage unit 202, a key that was generated by the key generation unit 201 on September 16 four days before September 20. By referring to the key storage table shown in the example of FIG. 3, the key generated by the key generation unit 201 on September 16 is a key [d-4]. Hence, the transmission key determination unit 209 reads out the key [d-4] from the key storage unit 202, and inputs it to the key transmission unit 210.

The key transmission unit 210 transmits the input key [d-4] to the user terminal 102 via the public communication network 109 and base station 106 (step S108). When the key reception unit 218 receives the key via the public network communication unit 104, the output unit 219 of the user terminal 102 displays a window representing that the key has been received (step S109).

Upon reception of the key, the key reception unit 218 inputs the received key to the key storage unit 220. The key storage unit 220 stores the input key (e.g., key [d-4]) (step S110).

Figure 7:
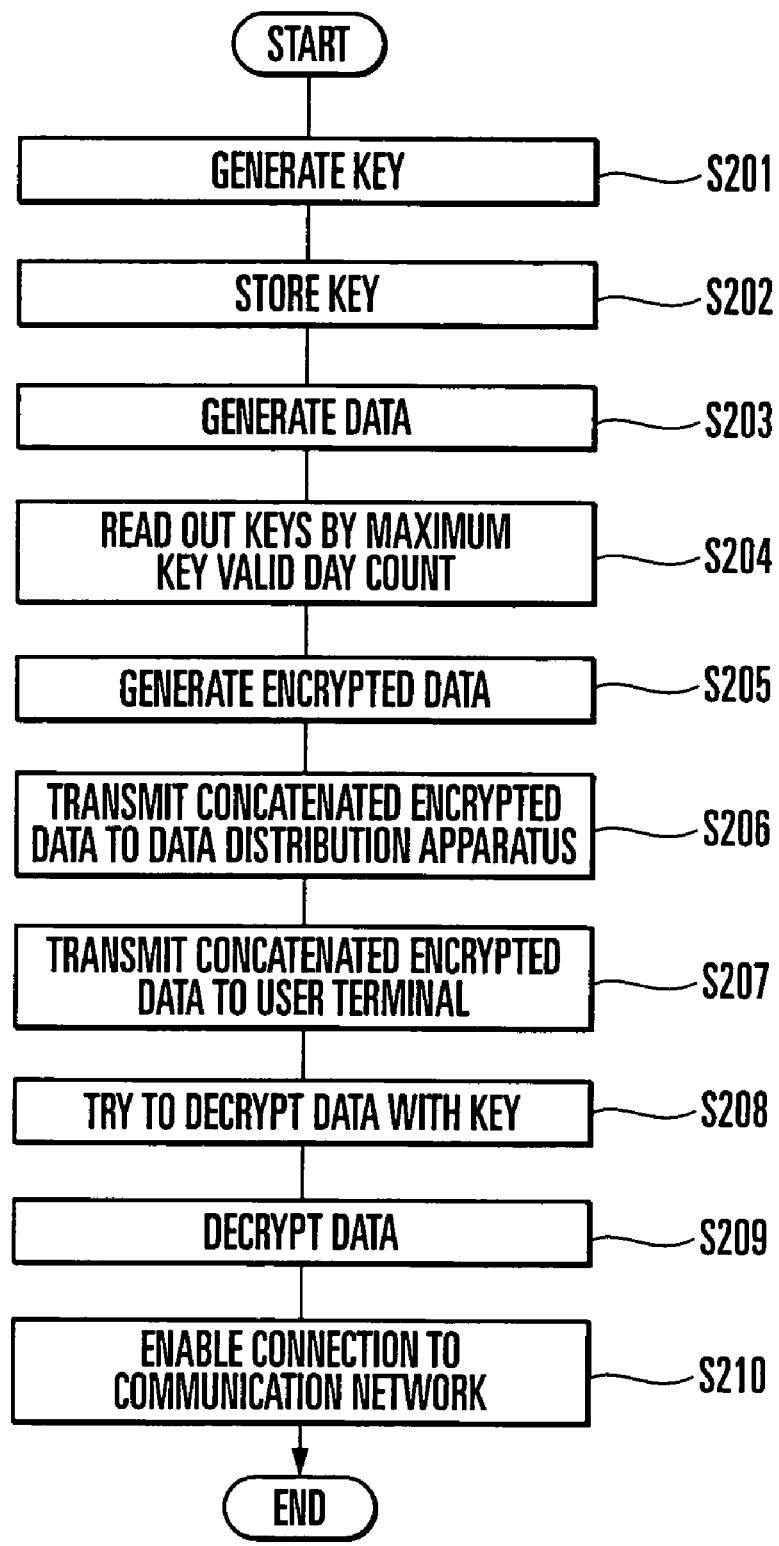
FIG. 7 is a flowchart for explaining operation when the user terminal receives data from the data distribution apparatus in the first embodiment.

Operation when the user terminal 102 receives data from the data distribution apparatus 101 will be explained. FIG. 7 shows operation when the user terminal 102 receives data from the data distribution apparatus 101 in the first embodiment.

The key generation unit 201 of the data distribution server 100 generates one key every day (step S201), and inputs the key to the key storage unit 202. The key storage unit 202 stores the input key (step S202), and makes the input key and key generation date correspond to each other in the key storage table.

The data generation unit 204 generates data to be transmitted to the user terminal 102 by one-way communication (step S203), and inputs the data to the data encryption unit 205. The key selection unit 203 reads out keys by the latest maximum key valid day count from the key storage unit 202 (step S204), and inputs the keys to the data encryption unit 205.

For example, when the maximum key valid day count is 7 and today is September 20, the key selection unit 203 reads out keys which were generated by the key generation unit 201 from September 14 to September 20.

The data encryption unit 205 generates encrypted data by encrypting data input from the data generation unit 204 with keys input from the key selection unit 203 by the maximum key valid day count (step S205). The data encryption unit 205 inputs the generated encrypted data to the server encrypted-data transmission unit 206. The server encrypted-data transmission unit 206 concatenates the input encrypted data into one, and generates concatenated encrypted data by adding, to the start of the concatenated encrypted data, a header representing the start of each encrypted data. Then, the server encrypted-data transmission unit 206 transmits the concatenated encrypted data to the data distribution apparatus 101 via the communication network 108 (step S206).

The header added to the start of the concatenated encrypted data represents the start of the concatenated encrypted data. In addition, the header added to the start of the concatenated encrypted data contains information representing, for each encrypted data, which bit number counted from the start of the concatenated encrypted data is the start of the encrypted data. The method of representing the start of each encrypted data by a header is not limited to this, and the start of each encrypted data may be represented by another method.

Figure 8A:
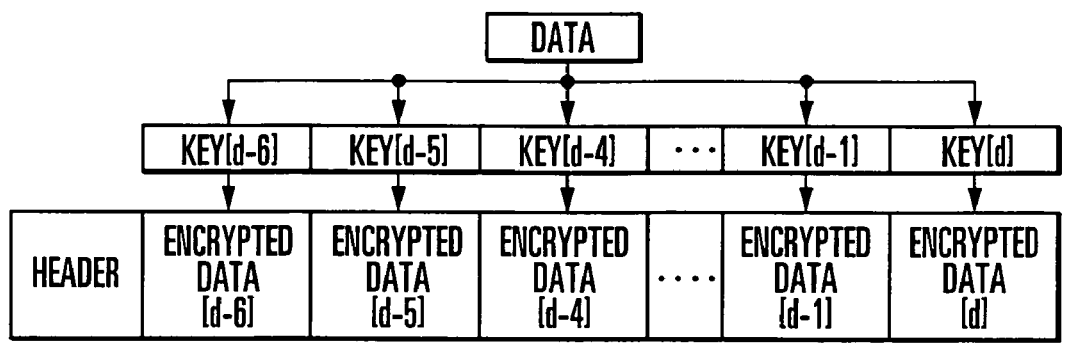
FIGS. 8A and 8B are views for explaining a process for data generated by a data generation unit in the first embodiment.
Figure 8B:
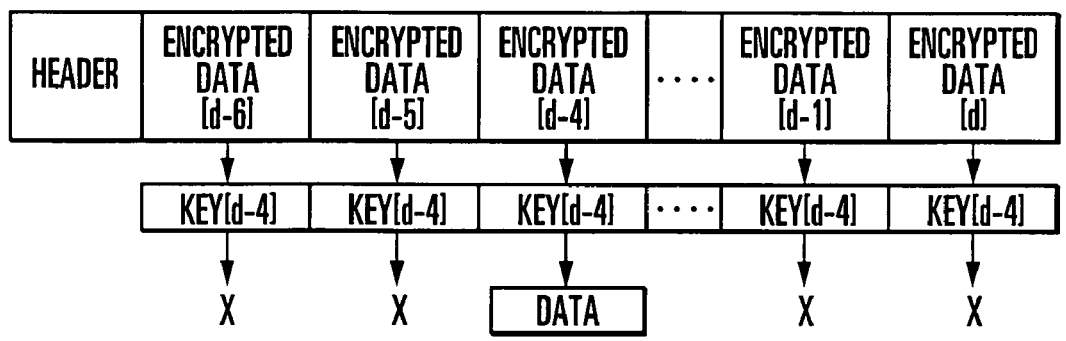

FIGS. 8A and 8B show a process for data generated by the data generation unit 204. Referring to FIG. 8A, the data encryption unit 205 generates encrypted data by encrypting data generated by the data generation unit 204 with a key input from the key selection unit 203. For example, when the key selection unit 203 inputs seven keys to the data encryption unit 205, the data encryption unit 205 generates seven encrypted data.

The data encryption unit 205 inputs the generated encrypted data to the server encrypted-data transmission unit 206. The server encrypted-data transmission unit 206 concatenates the input encrypted data into one, and generates concatenated encrypted data by adding, to the start of one concatenated encrypted data, a header representing the start of each encrypted data.

Upon reception of the concatenated encrypted data, the encrypted-data reception unit 212 of the data distribution apparatus 101 inputs the received concatenated encrypted data to the encrypted-data storage unit 213. The encrypted-data transmission unit 214 of the data distribution apparatus 101 reads out the concatenated encrypted data input to the encrypted-data storage unit 213, and transmits the readout concatenated encrypted data to the user terminal 102 by visible light (step S207). The encrypted-data transmission unit 214 preferably transmits the concatenated encrypted data repetitively a plurality of number of times in order to allow the visible light receiving unit 103 of the user terminal 102 to reliably receive visible light and receive the concatenated encrypted data.

Upon reception of the concatenated encrypted data via the visible light receiving unit 103, the terminal encrypted-data reception unit 221 of the user terminal 102 inputs the received concatenated encrypted data to the data decryption unit 222. The data decryption unit 222 reads the header added to the start of the concatenated encrypted data, and specifies the start of each of the encrypted data which are concatenated into one. The data decryption unit 222 tries to use the key stored in the key storage unit 220 and decrypt a part following the specified start of each encrypted data (step S208).

Referring to FIG. 8B, for example, when the key storage unit 220 of the user terminal 102 stores the key [d-4], the data decryption unit 222 can decrypt part of one concatenated encrypted data that has been encrypted with the key [d-4] (step S209).

The data decryption unit 222 inputs the decrypted data to the data use unit 223. For example, when the data input to the data use unit 223 is setting information of the near-field communication unit 105 of the wireless LAN, the near-field communication unit 105 can be connected to the communication network 108 via the wireless LAN access point 107 (step S210).

That is, the data decryption unit 222 can decrypt the concatenated encrypted data by using the key [d-4] till September 22. Another terminal cannot decrypt the concatenated encrypted data unless it stores the key even upon reception of the concatenated encrypted data. When another terminal stores another key (e.g., key [d-3]), it can decrypt the concatenated encrypted data till September 23.

Even on September 21 and 22, the key selection unit 203 which reads out keys from the key storage unit 202 by the maximum key valid day count selects the key [d-4] transmitted in advance to the user terminal 102. The data encryption unit 205 encrypts data with the key [d-4] selected by the key selection unit 203. After September 23, the key selection unit 203 does not select the key [d-4].

As described above, according to the first embodiment, the data use condition which changes depending on the terminal can be set in accordance with a key transmitted in advance to each terminal even when encrypted data is transmitted to a plurality of terminals by one-way communication.

Since the maximum key valid day count of the key [d-4] generated on September 16 is 7, the data decryption unit 222 of the user terminal 102 cannot decrypt, by using the key [d-4] distributed on September 20, encrypted data which is distributed by the data distribution apparatus 101 after September 23. Hence, the first embodiment can keep the key valid day count described in the user information storage table of the user information storage unit 208, and can limit the period during which data transmitted to the user terminal 102 can be utilized.

The data generation unit 204 may generate different kinds of data (e.g., connection setting data with the wireless LAN access point 107, connection setting data with another wireless LAN access point, and setting data for operating the user terminal 102 as an IP (Internet Protocol) phone). The data encryption unit 205 may encrypt the respective data with one key transmitted in advance to the user terminal 102. The data decryption unit 222 of the user terminal 102 may decrypt the respective encrypted data with one key. The data use unit 223 may utilize the respective decrypted data.

In this case, one user terminal 102 can decrypt a plurality of data with one key received in advance, and the data use unit 223 can exploit the respective decrypted data.

Second Embodiment

The second embodiment of the present invention will be described. The configuration of the second embodiment of the present invention is the same as that of the first embodiment. The same reference numerals as in FIGS. 1 and 2 denote the same parts, and a description thereof will be omitted.

Figure 9:
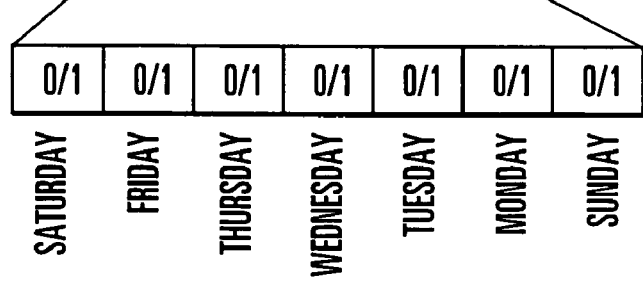
FIG. 9 is a table showing an example of a user information table in the second embodiment.

FIG. 9 shows an example of a user information table stored in a user information storage unit 208 in the second embodiment.

The user information table in the second embodiment makes a user ID and password correspond to a terminal key valid day of the week representing a day of the week on which a data decryption unit 222 of a user terminal 102 can decrypt data, instead of the terminal key valid day count of the user information table in the first embodiment shown in the example of FIG. 4. More specifically, as shown in the example of FIG. 9, the first bit of a binary number represents Sunday, the second bit represents Monday, and so forth. The seventh bit represents Saturday. Each bit corresponding to a day of the week on which the data decryption unit 222 of the user terminal 102 can decrypt data is set to "1". The bit corresponding to a day of the week on which the data decryption unit 222 of the user terminal 102 cannot decrypt data is set to "0".

For example, when the user ID is "ccc" and the password is "345", terminal key valid days of the week are Sunday, Monday, and Tuesday by referring to the user information table shown in the example of FIG. 9.

FIG. 10 shows an example of a key storage table stored in a key storage unit 202 in the second embodiment.

The key storage table in the second embodiment makes a terminal key valid day of the week correspond to a key, in place of a key generation date in the key storage table according to the first embodiment shown in the example of FIG. 3.

More specifically, as shown in the example of FIG. 10, the first bit of a binary number represents Sunday, the second bit represents Monday, and so forth. The seventh bit represents Saturday. Each bit corresponding to a day of the week on which the data decryption unit 222 of the user terminal 102 can decrypt data is set to "1". The bit corresponding to a day of the week on which the data decryption unit 222 of the user terminal 102 cannot decrypt data is set to "0".

For example, terminal key valid days of the week for a key [7] are Sunday, Monday, and Tuesday by referring to the key storage table shown in the example of FIG. 10.

As shown in the example of FIG. 10, the key storage unit 202 stores keys corresponding to all combinations of days of the week. That is, the key storage unit 202 stores 128 keys.

Operation of the second embodiment according to the present invention will be explained with reference to the accompanying drawings. Preliminary operation before the user terminal 102 receives data such as various kinds of setting information from a data distribution server 100 will be explained. This operation is executed after, for example, the user is registered as a member by the administrators of the data distribution server 100 and a data distribution apparatus 101. The operation need not be executed every time data is received by one-way communication.

Assume that the administrator of the data distribution server 100 issues a user ID and password when the user is registered as a member, the user information storage unit 208 stores the issued user ID and password in correspondence with a terminal key valid day of the week corresponding to the user, and the administrator of the data distribution server 100 notifies the user of the issued user ID and password. The administrator of the data distribution server 100 may determine the number of terminal key valid days of the week, terminal key valid days of the week, and the like in accordance with, e.g., the amount of money paid by the user in member registration.

Figure 11:
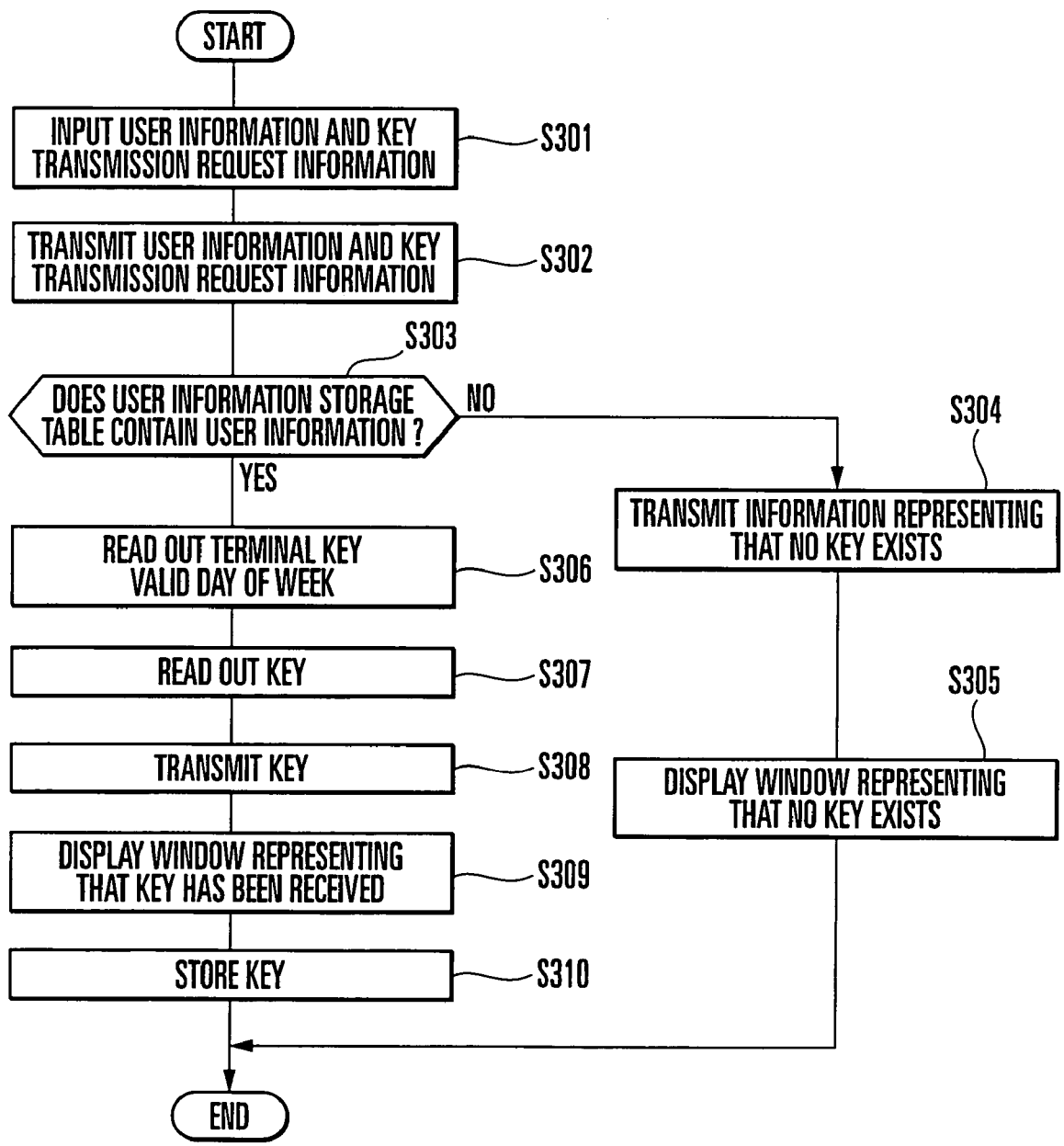
FIG. 11 is a flowchart for explaining preliminary operation in the second embodiment of the present invention.

FIG. 11 shows preliminary operation in the second embodiment of the present invention. The user operates, e.g., the buttons of an input unit 216 of the user terminal 102 to input a user ID and password serving as user information, and key transmission request information representing a request to transmit a key (step S301).

The input unit 216 outputs the input user information and key transmission request information to a key request transmission unit 217. The key request transmission unit 217 transmits the user information and key transmission request information to the data distribution server 100 via a public network communication unit 104, base station 106, and public communication network 109 (step S302).

Upon reception of the user information and key transmission request information, a key request reception unit 207 of the data distribution server 100 inputs the user ID and password of the user information to a transmission key determination unit 209. The transmission key determination unit 209 determines whether the input user ID and password are contained in a user information storage table stored in the user information storage unit 208 (step S303).

If the transmission key determination unit 209 determines that the input user ID and password are not contained in the user information storage table, it notifies a key transmission unit 210 that a key to be transmitted does not exist. The key transmission unit 210 transmits, to the user terminal 102 via the public communication network 109 and base station 106, information representing that a key to be transmitted does not exist (step S304). When a key reception unit 218 receives, via the public network communication unit 104, the information representing that a key to be transmitted does not exist, an output unit 219 of the user terminal 102 displays a window representing that a key to be transmitted does not exist (step S305).

If the transmission key determination unit 209 determines that the input user ID and password are contained in the user information storage table, it reads out the value of a terminal key valid day of the week corresponding to the input user ID and password (step S306). For example, when the user ID is "ccc" and the password is "345", the value representing the terminal key valid day of the week is "0000111" by referring to the user information table shown in the example of FIG. 9.

The transmission key determination unit 209 refers to the key storage table stored in the key storage unit 202, and reads out a key corresponding to the readout value representing the terminal key valid day of the week from the key storage unit 202 (step S307). Then, the transmission key determination unit 209 inputs the key to the key transmission unit 210.

For example, when the value which is read out from the user information storage table and represents the terminal key valid day of the week is "0000111", the transmission key determination unit 209 refers to the key storage table stored in the key storage unit 202, reads out the key [7] corresponding to the value "0000111" of the terminal key valid day of the week, and inputs the key [7] to the key transmission unit 210.

The key transmission unit 210 transmits the input key [7] to the user terminal 102 via the public communication network 109 and base station 106 (step S308). When the key reception unit 218 receives the key via the public network communication unit 104, the output unit 219 of the user terminal 102 displays a window representing that the key has been received (step S309).

Upon reception of the key, the key reception unit 218 inputs the received key to the key storage unit 220. The key storage unit 220 stores the input key (e.g., key [7]) (step S310).

Figure 12:
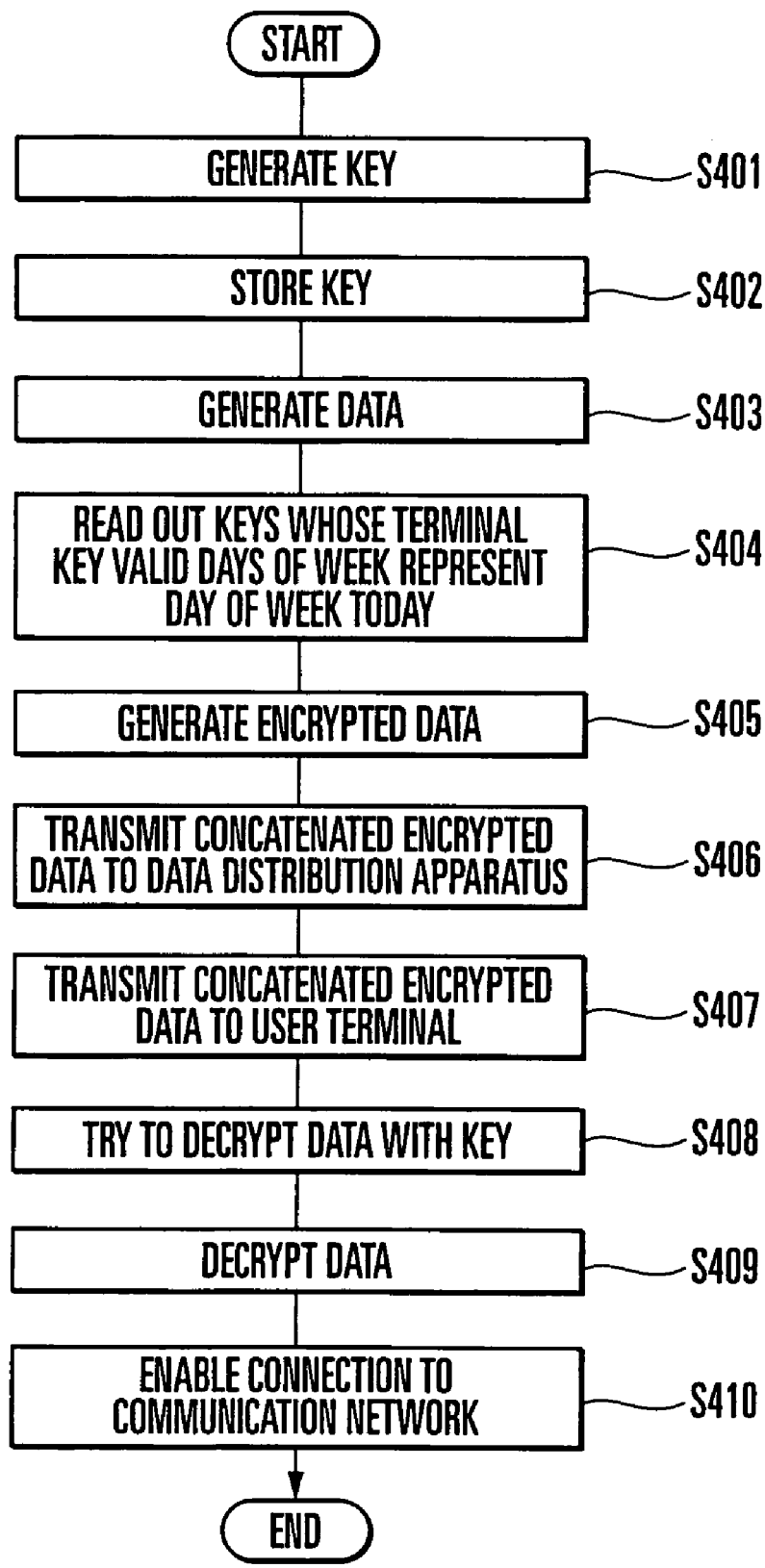
FIG. 12 is a flowchart for explaining operation when the user terminal receives data from the data distribution apparatus in the second embodiment.

Operation when the user terminal 102 receives data from the data distribution apparatus 101 will be explained. FIG. 12 shows operation when the user terminal 102 receives data from the data distribution apparatus 101 in the second embodiment.

A key generation unit 201 of the data distribution server 100 generates keys corresponding to all combinations of days of the week (step S401), and inputs the keys to the key storage unit 202. The key storage unit 202 stores the input keys (step S402), and makes the input keys and their terminal key valid days of the week correspond to each other in the key storage table. That is, the key generation unit 201 generates 128 keys, and the key storage unit 202 stores the 128 keys and their terminal key valid days of the week in correspondence with each other.

A data generation unit 204 generates data to be transmitted to the user terminal 102 by one-way communication (step S403), and inputs the data to a data encryption unit 205. A key selection unit 203 refers to the key storage table, reads out, from the key storage unit 202, and keys whose terminal key valid days of the week represent the day of the week today (step S404). The key selection unit 203 inputs the readout keys to the data encryption unit 205.

For example, when today is Monday, the key selection unit 203 refers to the key storage table, and reads out keys corresponding to a terminal key valid day of the week whose value is "1" at the second bit. In other words, the key selection unit 203 reads out 64 keys [2], [3], [6], [7], . . . , [126], and [127].

The data encryption unit 205 generates encrypted data by encrypting data input from the data generation unit 204 with keys input from the key selection unit 203 (step S405). The data encryption unit 205 inputs the generated encrypted data to the server encrypted-data transmission unit 206. The server encrypted-data transmission unit 206 concatenates the input encrypted data into one, and generates concatenated encrypted data by adding, to the start of the concatenated encrypted data, a header representing the start of each encrypted data. Then, the server encrypted-data transmission unit 206 transmits the concatenated encrypted data to the data distribution apparatus 101 via a communication network 108 (step S406).

FIGS. 13A and 13B show a process for data generated by the data generation unit 204. Referring to FIG. 13A, the data encryption unit 205 generates encrypted data by encrypting data generated by the data generation unit 204 with a key input from the key selection unit 203. For example, when the key selection unit 203 inputs 64 keys to the data encryption unit 205, the data encryption unit 205 generates 64 encrypted data.

The data encryption unit 205 inputs the generated encrypted data to the server encrypted-data transmission unit 206. The server encrypted-data transmission unit 206 concatenates the input encrypted data into one, and generates concatenated encrypted data by adding, to the start of one concatenated encrypted data, a header representing the start of each encrypted data.

Upon reception of the concatenated encrypted data, an encrypted-data reception unit 212 of the data distribution apparatus 101 inputs the received concatenated encrypted data to an encrypted-data storage unit 213. An encrypted-data transmission unit 214 of the data distribution apparatus 101 reads out the concatenated encrypted data input to the encrypted-data storage unit 213, and repetitively transmits the readout concatenated encrypted data to the user terminal 102 by visible light (step S407).

Upon reception of the concatenated encrypted data via a visible light receiving unit 103, a terminal encrypted-data reception unit 221 of the user terminal 102 inputs the received concatenated encrypted data to the data decryption unit 222. The data decryption unit 222 reads the header added to the start of the concatenated encrypted data, and specifies the start of each of the encrypted data which are concatenated into one. The data decryption unit 222 tries to use the key stored in the key storage unit 220 and decrypt a part following the specified start of each encrypted data (step S408).

Referring to FIG. 13B, for example, when the key storage unit 220 of the user terminal 102 stores the key [7], the data decryption unit 222 can decrypt part of one concatenated encrypted data that has been encrypted with the key [7] (step S409).

The data decryption unit 222 inputs the decrypted data to a data use unit 223. For example, when the data input to the data use unit 223 is setting information of a near-field communication unit 105 of a wireless LAN, the near-field communication unit 105 can be connected to the communication network 108 via a wireless LAN access point 107 (step S410).

That is, the data decryption unit 222 can decrypt the concatenated encrypted data on Sunday, Monday, and Tuesday by using the key [7]. Another terminal cannot decrypt the concatenated encrypted data unless it stores the key even upon reception of the concatenated encrypted data. When another terminal stores another key (e.g., key [6]), it can decrypt the concatenated encrypted data on Monday and Tuesday.

As described above, according to the second embodiment, the data use condition which changes depending on the terminal can be set in accordance with a key transmitted in advance to each terminal even when encrypted data is transmitted to a plurality of terminals by one-way communication.

When today is Wednesday, the key selection unit 203 of the data distribution server 100 does not select the key [7]. The data decryption unit 222 of the user terminal 102 cannot decrypt, by using the key [7], concatenated encrypted data which has been received on Wednesday. As a result, the second embodiment can keep the terminal key valid day of the week of a key that is described in the user information storage table of the user information storage unit 208, and can limit a day of the week on which data transmitted to the user terminal 102 can be utilized.

In the second embodiment, the period during which the data use unit 223 of the user terminal 102 can use data is limited by a day of the week. However, the present invention is not limited to this, and the period may be limited by the time period.

Third Embodiment

Figure 14:
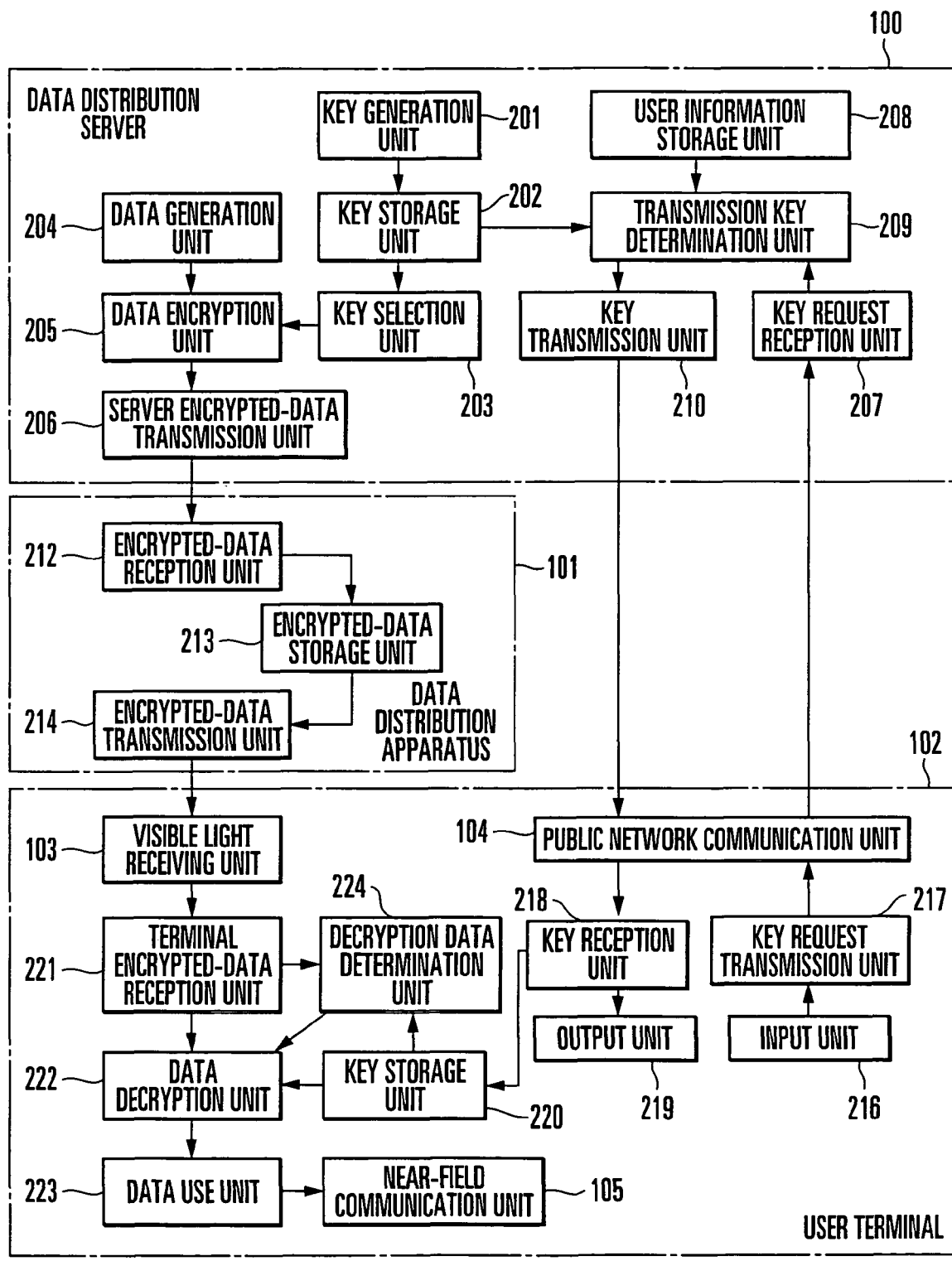
FIG. 14 is a block diagram showing an example of a configuration in the third embodiment of the present invention.

The third embodiment of the present invention will be described with reference to the accompanying drawings. FIG. 14 shows an example of a configuration in the third embodiment of the present invention.

The configuration in the third embodiment of the present invention is different from that in the first embodiment in that the user terminal 102 in the configuration of the first embodiment is equipped with a decryption data determination unit 224 which determines part of concatenated encrypted data that is to be decrypted by a data decryption unit 222. The remaining configuration is the same as that of the first embodiment. The same reference numerals as in FIGS. 1 and 2 according to the first embodiment denote the same parts, and a description thereof will be omitted.

Operation of the third embodiment according to the present invention will be explained with reference to the accompanying drawings. Preliminary operation before a user terminal 102 receives data such as various kinds of setting information from a data distribution server 100 will be explained. This operation is executed after, for example, the user is registered as a member by the administrators of the data distribution server 100 and a data distribution apparatus 101. The operation need not be executed every time data is received by one-way communication.

Assume that the administrator of the data distribution server 100 issues a user ID and password when the user is registered as a member, a user information storage unit 208 stores the issued user ID and password in correspondence with a terminal key valid day count corresponding to the user, and the administrator of the data distribution server 100 notifies the user of the issued user ID and password. The administrator of the data distribution server 100 may determine a terminal key valid day count in accordance with, e.g., the amount of money paid by the user in member registration.

Figure 15:
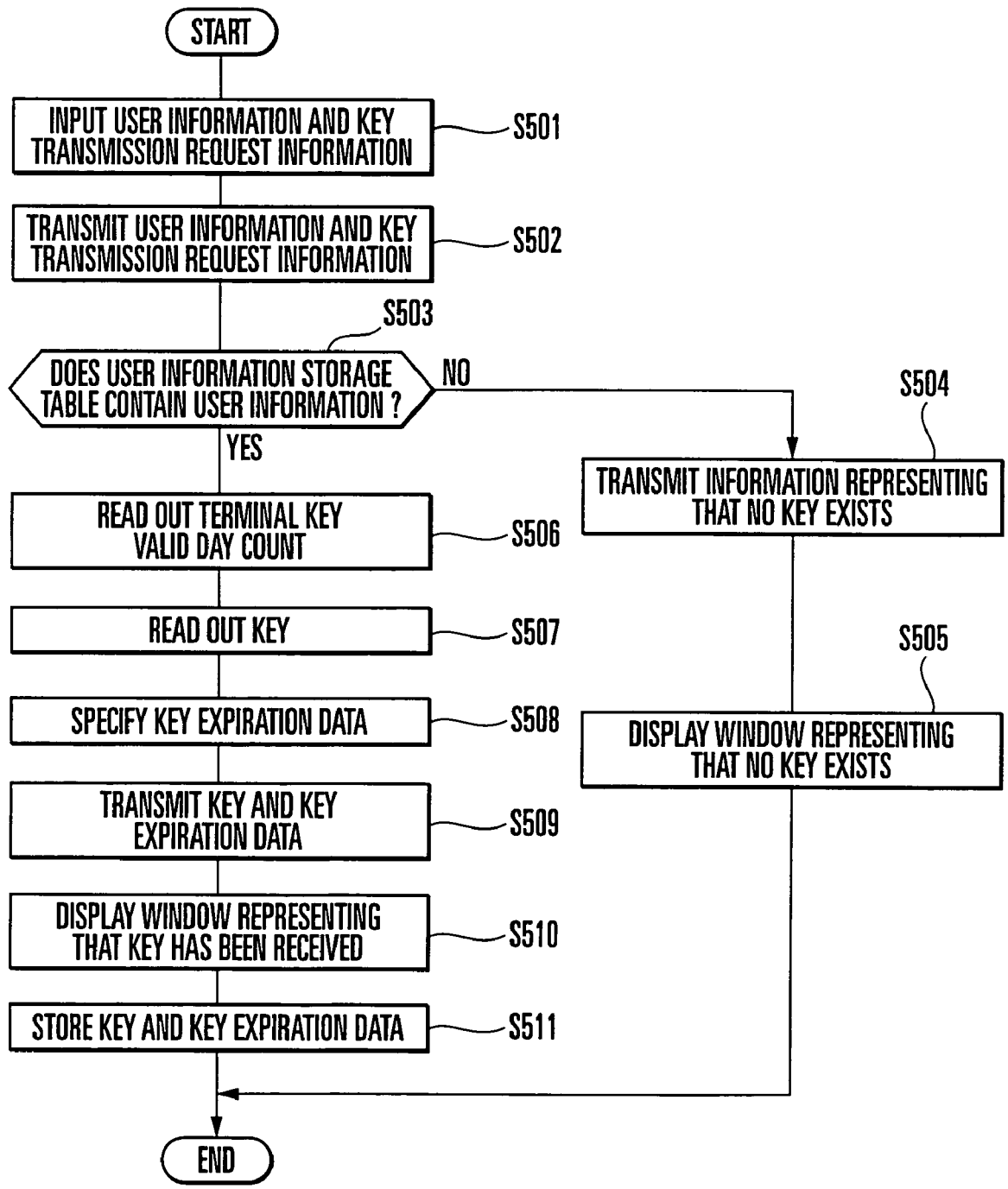
FIG. 15 is a flowchart for explaining preliminary operation in the third embodiment of the present invention.

FIG. 15 shows preliminary operation in the third embodiment of the present invention. The user operates, e.g., the buttons of an input unit 216 of the user terminal 102 to input a user ID and password serving as user information, and key transmission request information representing a request to transmit a key (step S501).

The input unit 216 outputs the input user information and key transmission request information to a key request transmission unit 217. The key request transmission unit 217 transmits the user information and key transmission request information to the data distribution server 100 via a public network communication unit 104, base station 106, and public communication network 109 (step S502).

Upon reception of the user information and key transmission request information, a key request reception unit 207 of the data distribution server 100 inputs the user ID and password of the user information to a transmission key determination unit 209. The transmission key determination unit 209 determines whether the input user ID and password are contained in a user information storage table stored in the user information storage unit 208 (step S503).

If the transmission key determination unit 209 determines that the input user ID and password are not contained in the user information storage table, it notifies a key transmission unit 210 that a key to be transmitted does not exist. The key transmission unit 210 transmits, to the user terminal 102 via the public communication network 109 and base station 106, information representing that a key to be transmitted does not exist (step S504). When a key reception unit 218 receives, via the public network communication unit 104, the information representing that a key to be transmitted does not exist, an output unit 219 of the user terminal 102 displays a window representing that a key to be transmitted does not exist (step S505).

If the transmission key determination unit 209 determines that the input user ID and password are contained in the user information storage table, it reads out a terminal key valid day count corresponding to the input user ID and password (step S506). The terminal key valid day count is a value which defines the number of valid days of a key distributed by the data distribution server 100 to the user terminal 102. For example, when the user ID is "ccc" and the password is "345", the terminal key valid day count is 3 by referring to the user information table shown in the example of FIG. 4.

The transmission key determination unit 209 refers to a key storage table stored in a key storage unit 202, and reads out, from the key storage unit 202, a key which was generated by a key generation unit 201 before (maximum key valid day count−terminal key valid day count) days (step S507). Then, the transmission key determination unit 209 inputs the key to the key transmission unit 210. The maximum key valid day count is a value which defines in advance the maximum number of days for which a key transmitted to the user terminal 102 can be utilized. A key whose valid day count is larger than the maximum key valid day count cannot be transmitted to the user terminal 102.

For example, when the maximum key valid day count is 7, the terminal key valid day count is 3, and the date when the key request reception unit 207 received user information and key transmission request information is September 20, the transmission key determination unit 209 refers to the key storage table stored in the key storage unit 202, and reads outs, from the key storage unit 202, a key which was generated by the key generation unit 201 before four days because (maximum key valid day count−terminal key valid day count) =7−3=4.

More specifically, the transmission key determination unit 209 refers to the key storage table stored in the key storage unit 202, and reads out, from the key storage unit 202, a key which was generated by the key generation unit 201 on September 16 four days before September 20. By referring to the key storage table shown in the example of FIG. 3, the key generated by the key generation unit 201 on September 16 is a key [d-4]. Hence, the transmission key determination unit 209 reads out the key [d-4] from the key storage unit 202, and inputs it to the key transmission unit 210.

The transmission key determination unit 209 specifies a key expiration date serving as the expiration date of a key on the basis of the terminal key valid day count and the date when the user information and key transmission request information were received (step S508).

For example, when the date when the user information and key transmission request information were received is September 20, the key expiration date is September 22 two days after September 20 as a result of applying the date (September 20) when the user information and key transmission request information were received.

The transmission key determination unit 209 inputs the specified key expiration date to the key transmission unit 210. The key transmission unit 210 transmits the input key [d-4] and key expiration date to the user terminal 102 via the public communication network 109 and base station 106 (step S509). When the key reception unit 218 receives the key and key expiration date via the public network communication unit 104, the output unit 219 of the user terminal 102 displays a window representing that the key has been received (step S510).

Upon reception of the key and key expiration date, the key reception unit 218 inputs the received key and key expiration date to a key storage unit 220. The key storage unit 220 stores the input key (e.g., key [d-4]), and the key expiration date (e.g., September 22) (step S511).

Figure 16:
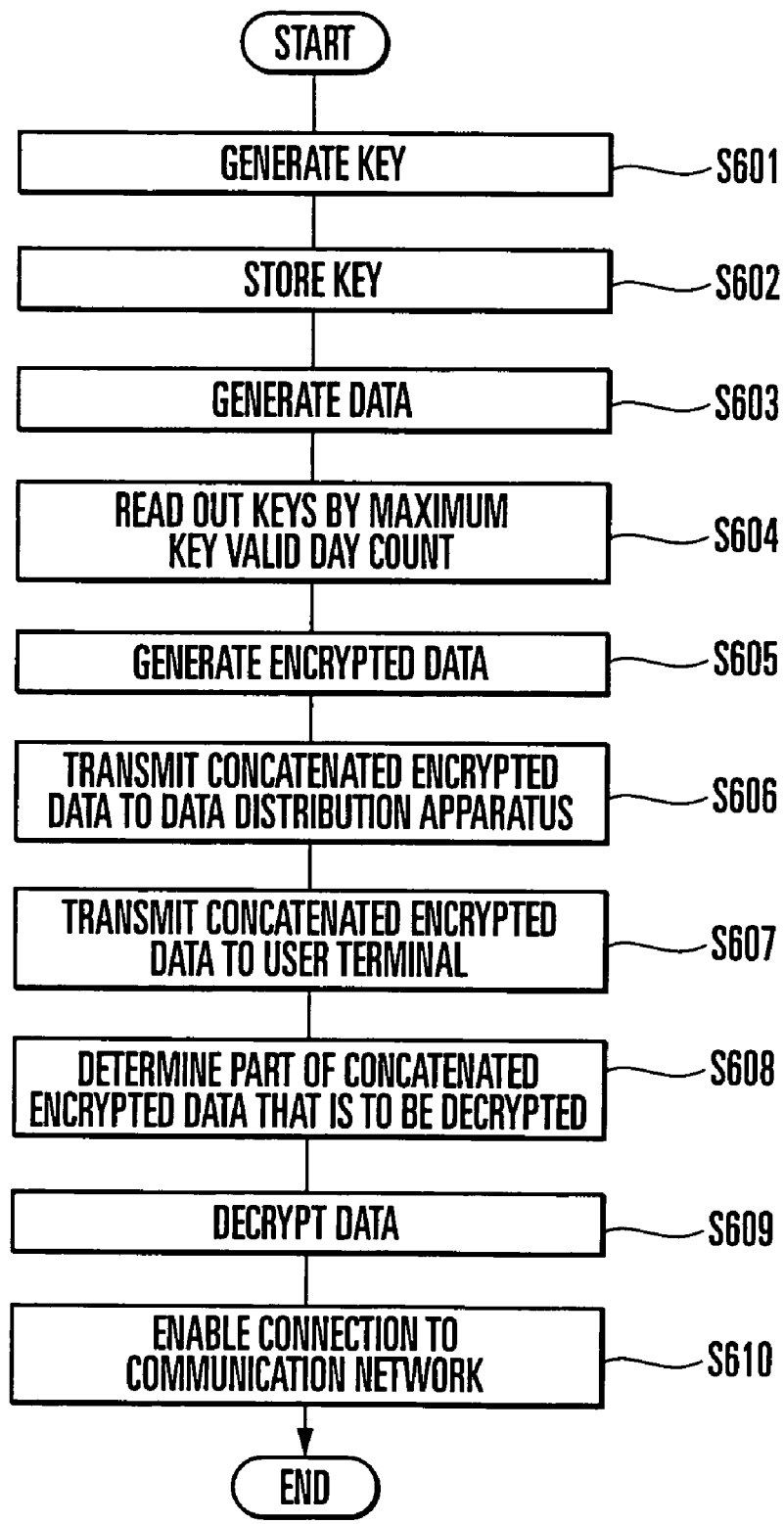
FIG. 16 is a flowchart for explaining operation when the user terminal receives data from the data distribution apparatus in the third embodiment.

Operation when the user terminal 102 receives data from the data distribution apparatus 101 will be explained. FIG. 16 shows operation when the user terminal 102 receives data from the data distribution apparatus 101 in the third embodiment.

The key generation unit 201 of the data distribution server 100 generates one key every day (step S601), and inputs the key to the key storage unit 202. The key storage unit 202 stores the input key (step S602), and makes the input key and key generation date correspond to each other in the key storage table.

A data generation unit 204 generates data to be transmitted to the user terminal 102 by one-way communication (step S603), and inputs the data to a data encryption unit 205. A key selection unit 203 reads out keys by the latest maximum key valid day count from the key storage unit 202 (step S604), and inputs the keys to the data encryption unit 205.

For example, when the maximum key valid day count is 7 and today is September 20, the key selection unit 203 reads out keys which were generated by the key generation unit 201 from September 14 to September 20.

The data encryption unit 205 generates encrypted data by encrypting data input from the data generation unit 204 with keys input from the key selection unit 203 by the maximum key valid day count (step S605). The data encryption unit 205 inputs the generated encrypted data to a server encrypted-data transmission unit 206. The server encrypted-data transmission unit 206 concatenates the input encrypted data into one, and generates concatenated encrypted data by adding, to the start of the concatenated encrypted data, a header representing the start of each encrypted data. Then, the server encrypted-data transmission unit 206 transmits the concatenated encrypted data to the data distribution apparatus 101 via a communication network 108 (step S606).

The data encryption unit 205 inputs the generated encrypted data to the server encrypted-data transmission unit 206. The server encrypted-data transmission unit 206 concatenates the input encrypted data into one, and generates concatenated encrypted data by adding, to the start of one concatenated encrypted data, a header representing the start of each encrypted data.

Upon reception of the concatenated encrypted data, an encrypted-data reception unit 212 of the data distribution apparatus 101 inputs the received concatenated encrypted data to an encrypted-data storage unit 213. An encrypted-data transmission unit 214 of the data distribution apparatus 101 reads out the concatenated encrypted data input to the encrypted-data storage unit 213, and repetitively transmits the readout concatenated encrypted data to the user terminal 102 by visible light (step S607).

Upon reception of the concatenated encrypted data via the visible light receiving unit 103, a terminal encrypted-data reception unit 221 of the user terminal 102 inputs the received concatenated encrypted data to the decryption data determination unit 224.

The decryption data determination unit 224 reads out the key stored in the key storage unit 220, and the key expiration date. The decryption data determination unit 224 calculates (key expiration date today's date+1), and determines part of the concatenated encrypted data that is to be decrypted by the data decryption unit 222 with the key (step S608).

For example, when the key expiration date is September 22 and today is September 20, 22−20+1=3, the decryption data determination unit 224 determines that the third encrypted data (including no header) of the concatenated encrypted data is to be decrypted by the data decryption unit 222. The decryption data determination unit 224 generates decryption part information representing the determined part.

When the month of the key expiration date and that of today's date are different, the decryption data determination unit 224 changes either date and calculates (key expiration date−today's date+1). The decryption data determination unit 224 may store a calendar in advance.

When the calculation result of (key expiration date−today's date+1) is 0 or less, the decryption data determination unit 224 may display on the output unit 219 a window representing that no valid key is stored.

The decryption data determination unit 224 inputs the decryption part information, key, and concatenated encrypted data to the data decryption unit 222.

The data decryption unit 222 reads the header added to the start of the concatenated encrypted data, and specifies the start of each of the encrypted data which are concatenated into one. The data decryption unit 222 decrypts, with the key input from the decryption data determination unit 224, the part represented by the decryption part information input from the decryption data determination unit 224 (step S609).

Referring to FIG. 8B, for example, when the decryption part information represents the third encrypted data and the key storage unit 220 of the user terminal 102 stores the key [d-4], the data decryption unit 222 tries to decrypt the third encrypted data of one concatenated encrypted data. Referring to FIG. 8A, since the third encrypted data of the concatenated encrypted data has been encrypted with the key [d-4], the data decryption unit 222 can decrypt the encrypted data with the key [d-4].

The data decryption unit 222 inputs the decrypted data to a data use unit 223. For example, when the data input to the data use unit 223 is setting information of a near-field communication unit 105 of a wireless LAN, the near-field communication unit 105 can be connected to the communication network 108 via a wireless LAN access point 107 (step S610).

Even on September 21 and 22, the key selection unit 203 which reads out keys from the key storage unit 202 by the maximum key valid day count selects the key [d-4] transmitted in advance to the user terminal 102. The data encryption unit 205 encrypts data with the key [d-4] selected by the key selection unit 203. After September 23, the key selection unit 203 does not select the key [d-4].

As described above, according to the third embodiment, the data decryption unit 222 need not try to decrypt all encrypted data contained in concatenated encrypted data, and suffices to decrypt only encrypted data corresponding to a key stored in the key storage unit 220. This can reduce the load of the decryption process on the user terminal 102.

Fourth Embodiment

The fourth embodiment of the present invention will be described. The configuration of the fourth embodiment of the present invention is the same as that of the first embodiment of the present invention. The same reference numerals as in FIGS. 1 and 2 denote the same parts in the fourth embodiment, and a description thereof will be omitted.

Operation of the fourth embodiment according to the present invention will be explained. Preliminary operation before a user terminal 102 receives data such as various kinds of setting information from a data distribution server 100 is the same as that in the first embodiment, and a description thereof will be omitted.

Figure 17:
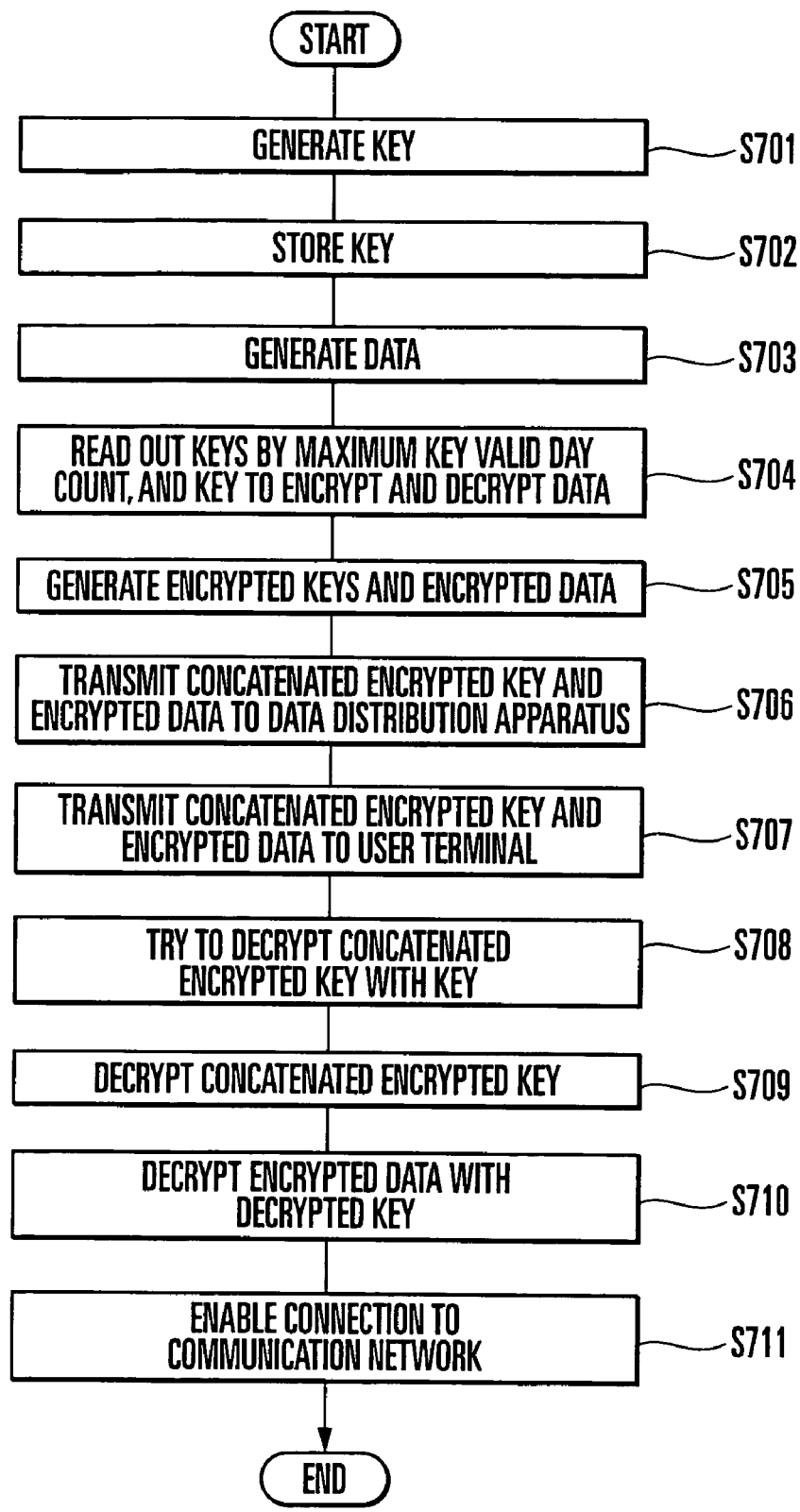
FIG. 17 is a flowchart for explaining operation when the user terminal receives data from the data distribution apparatus in the fourth embodiment.

Operation when the user terminal 102 receives data from a data distribution apparatus 101 will be explained. FIG. 17 shows operation when the user terminal 102 receives data from the data distribution apparatus 101 in the fourth embodiment.

A key generation unit 201 of the data distribution server 100 generates one key every day, and a key to encrypt and decrypt data (step S701), and inputs the keys to a key storage unit 202. The key storage unit 202 stores the input keys (step S702), and makes the input keys and key generation date correspond to each other in the key storage table.

A data generation unit 204 generates data to be transmitted to the user terminal 102 by one-way communication (step S703), and inputs the data to a data encryption unit 205. A key selection unit 203 reads out keys by the latest maximum key valid day count from the key storage unit 202, and the key to encrypt and decrypt data (step S704), and inputs the keys to the data encryption unit 205.

For example, when the maximum key valid day count is 7 and today is September 20, the key selection unit 203 reads out the key to encrypt data, and keys which were generated by the key generation unit 201 from September 14 to September 20.

The data encryption unit 205 generates encrypted data by encrypting data input from the data generation unit 204 with the key which is input from the key selection unit 203 and used to encrypt and decrypt data. The data encryption unit 205 generates encrypted keys by encrypting the key to encrypt and decrypt data with keys input from the key selection unit 203 by the maximum key valid day count (step S705). The data encryption unit 205 inputs the generated encrypted data and the encrypted keys to a server encrypted-data transmission unit 206. The server encrypted-data transmission unit 206 concatenates the input encrypted keys into one, and generates a concatenated encrypted key by adding, to the start of the concatenated encrypted key, a header representing the start of each encrypted key. Then, the server encrypted-data transmission unit 206 transmits the concatenated encrypted key together with the encrypted data to the data distribution apparatus 101 via a communication network 108 (step S706).

The header added to the start of the concatenated encrypted key represents the start of the concatenated encrypted key. In addition, the header added to the start of the concatenated encrypted key contains information representing, for each encrypted key, which bit number counted from the start of the concatenated encrypted key is the start of the encrypted key. The method of representing the start of each encrypted key by a header is not limited to this, and the start of each encrypted key may be represented by another method.

The data encryption unit 205 generates an encrypted key by encrypting, with a key input from the key selection unit 203, the key to encrypt and decrypt data. For example, when the key selection unit 203 inputs seven keys to the data encryption unit 205, the data encryption unit 205 generates seven encrypted keys.

The data encryption unit 205 inputs the generated encrypted key and encrypted data to the server encrypted-data transmission unit 206. The server encrypted-data transmission unit 206 concatenates the input encrypted keys into one, and generates a concatenated encrypted key by adding, to the start of one concatenated encrypted key, a header representing the start of each encrypted key.

Upon reception of the concatenated encrypted key and encrypted data, an encrypted-data reception unit 212 of the data distribution apparatus 101 inputs the received concatenated encrypted key and encrypted data to an encrypted-data storage unit 213. An encrypted-data transmission unit 214 of the data distribution apparatus 101 reads out the concatenated encrypted key and encrypted data which are input to the encrypted-data storage unit 213, and transmits the readout concatenated encrypted key and encrypted data to the user terminal 102 by visible light (step S707). The encrypted-data transmission unit 214 preferably transmits the concatenated encrypted data repetitively a plurality of number of times in order to allow a visible light receiving unit 103 of the user terminal 102 to reliably receive visible light and receive the concatenated encrypted data.

Upon reception of the concatenated encrypted key and encrypted data via the visible light receiving unit 103, a terminal encrypted-data reception unit 221 of the user terminal 102 inputs the received concatenated encrypted key and encrypted data to a data decryption unit 222. The data decryption unit 222 reads the header added to the start of the concatenated encrypted key, and specifies the start of each of the encrypted keys which are concatenated into one. The data decryption unit 222 tries to use the key stored in a key storage unit 220 and decrypt a part following the specified start of each encrypted key (step S708).

For example, when the key storage unit 220 of the user terminal 102 stores the key [d-4], the data decryption unit 222 can decrypt part of one concatenated encrypted key that has been encrypted with the key [d-4] (step S709).

The data decryption unit 222 decrypts the encrypted data with the decrypted key (step S710). Then, the data decryption unit 222 inputs the decrypted data to a data use unit 223. For example, when the data input to the data use unit 223 is setting information of a near-field communication unit 105 of a wireless LAN, the near-field communication unit 105 can be connected to the communication network 108 via a wireless LAN access point 107 (step S711).

As described above, the fourth embodiment can maintain data security because a key to decrypt data is encrypted and provided to the user terminal 102.

Note that the embodiments of the present invention may be combined. For example, the second and third embodiments may be combined so that the decryption data determination unit 224 determines, on the basis of the terminal key valid day of the week and a day of the week today, part of concatenated encrypted data that is to be decrypted by the data decryption unit 222.

The embodiments of the present invention employ a common key system, and encrypt and decrypt data with the same key. However, the present invention is not limited to this, and a public key system or the like may be adopted to encrypt and decrypt data with different keys.

As has been described above, the present invention can transmit, to a user terminal, data whose use period is limited in accordance with the user.

The present invention can be applied to a system which uses one-way communication to transmit information corresponding to the user.

What is claimed is:

1. A data transmission system comprising:
a server; and
a terminal which communicates with said server,
said server comprising:
an arithmetic processing unit;
a key storage unit for storing a plurality of digital keys; and
a memory,
wherein the arithmetic processing unit is configured to execute a program loaded into the memory, the program comprising the following processes:
a key generation process for generating a key having a limited valid period, outside of which said key is expired;
an encryption process for reading out, from the plurality of keys stored in said key storage unit, a set of plural unexpired keys, and encrypting unencrypted data with each of the keys in the set of plural unexpired keys to generate a plurality of encrypted data, wherein each encrypted data in the plurality represents the unencrypted data encrypted using one of the keys in the set of plural unexpired keys, wherein said encryption process concatenates the plurality of encrypted data, and adds to a start of the resultant concatenation, a header containing encrypted-data start information serving as information representing a start position of each encrypted data to thereby generate concatenated encrypted data,
a key transmission process for transmitting in advance, to said terminal, a key from the set of plural unexpired keys; and
an encrypted-data transmission process for transmitting, to said terminal, the concatenated encrypted data generated by said encryption unit, and
said terminal comprising a processor configured to decrypt the encrypted data transmitted from said server with the key transmitted in advance from said server, wherein said processor decrypts, on the basis of the encrypted-data start information contained in the concatenated encrypted data, encrypted data corresponding to the key transmitted in advance from said server out of the plurality of encrypted data concatenated as the concatenated encrypted data.

2. A system according to claim 1, wherein said server further comprises a transmission key determination process for determining a key to be transmitted by said key transmission process, in accordance with a user of said terminal.

3. A system according to claim 2, wherein said transmission key determination process determines one of the plurality of keys stored in said key storage unit as a key to be transmitted by said key transmission process.

4. The system according to claim 2, wherein said transmission key determination process generates key valid encrypted data information representing, out of the encrypted data which are concatenated as the concatenated encrypted data, encrypted data which can be decrypted with the key transmitted in advance by said key transmission process,
said key transmission process transmits in advance, to said terminal, the key valid encrypted data information generated by said transmission key determination process, and
said terminal decrypts, on the basis of the encrypted-data start information contained in the concatenated encrypted data and the key valid encrypted data information, the encrypted data corresponding to the key transmitted in advance from said server out of the encrypted data which are concatenated as the concatenated encrypted data.

5. A system according to claim 1, further comprising a transmitter configured to send to said terminal by a one-way communication method, encrypted data transmitted from said encrypted-data transmission process of said server,
wherein said terminal further comprises a receiver that receives the encrypted data transmitted by the one-way communication method by said transmitter.

6. A data transmission method comprising the steps of:
generating a plurality of keys each having a respective limited valid period, outside of which each key of the plurality of keys is expired;
storing the plurality of generated keys;
transmitting in advance, to a terminal, a key that has not yet expired from the plurality of keys;
generating a plurality of encrypted data by encrypting unencrypted data with a different key from a set of plural unexpired keys in the plurality of keys, wherein each encrypted data in the plurality represents the unencrypted data encrypted using one of the keys in the set of plural unexpired keys;

concatenating the plurality of encrypted data, and adding to a start of the resultant concatenation, a header containing encrypted-data start information serving as information representing a start position of each encrypted data in the plurality to thereby generate concatenated encrypted data;

transmitting the generated concatenated encrypted data to the terminal; and decrypting the encrypted data by the terminal with the key transmitted in advance.

7. A data transmission server comprising:

an arithmetic processing unit;

a key storage unit for storing a plurality of keys to encrypt data, each key having a limited valid period, outside of which said key is expired; and a memory, wherein the arithmetic processing unit is configured to execute a program loaded into the memory, the program comprising the following processes:

an encryption process for generating a plurality of encrypted data by encrypting unencrypted data with a different key from a set of plural unexpired keys in the plurality of keys stored in said key storage unit, wherein each encrypted data in the plurality represents the unencrypted data encrypted using one of the keys in the set of plural unexpired keys, concatenating the generated encrypted data, adding, to a start of the resultant concatenation, a header containing encrypted-data start information serving as information representing a start position of each encrypted data, and to thereby generate concatenated encrypted data;

a key transmission process for transmitting in advance one key from the set of plural unexpired keys to decrypt one of the encrypted data generated by said encryption process; and an encrypted-data transmission process for transmitting the concatenated encrypted data generated by said encryption process.

8. A data reception terminal comprising:

a first receiver that receives concatenated encrypted data obtained by concatenating a plurality of encrypted data prepared by encrypting unencrypted data with a different key from a set of plural unexpired keys to create the plurality of encrypted data, wherein each encrypted data in the plurality represents the unencrypted data encrypted using one of the keys in the set of plural unexpired keys, and adding, to a start of the resultant concatenation, a header containing encrypted-data start information serving as information representing a start position of each encrypted data in the plurality;

a second receiver that receives one key from a set of plural unexpired keys having a limited valid period, transmitted in advance, the key being used to decrypt one of the encrypted data in the plurality; and a processor configured to decrypt, on the basis of the encrypted-data start information contained in the received concatenated encrypted data, encrypted data corresponding to the received key out of said plurality of encrypted data concatenated as the concatenated encrypted data.

9. A non-transitory storage medium which records a program for causing a computer to execute the processes of:

causing a storage unit to store a plurality of keys to encrypt data, each key having a limited valid period, outside of which said key is expired, generating a plurality of encrypted data by encrypting unencrypted data with a different key from a set of plural unexpired keys in the plurality of keys stored in the storage unit, wherein each encrypted data in the plurality represents the unencrypted data encrypted using one of the keys in the set of plural unexpired keys, concatenating the generated encrypted data, adding, to a start of the resultant concatenation, a header containing encrypted-data start information serving as information representing a start position of each encrypted data to thereby generate, concatenated encrypted data, transmitting in advance one key from the set of plural unexpired keys to decrypt one of the generated encrypted data, and transmitting the generated concatenated encrypted data.

* * * * *